(12) United States Patent
Melancon et al.

(10) Patent No.: US 11,429,927 B1
(45) Date of Patent: Aug. 30, 2022

(54) SYSTEM AND METHOD TO PREDICT SERVICE LEVEL FAILURE IN SUPPLY CHAINS

(71) Applicant: JDA Software Group, Inc., Scottsdale, AZ (US)

(72) Inventors: Gabrielle Gauthier Melancon, Montréal (CA); Philippe Grangier, Montréal (CA); Eric Prescott-Gagnon, Montréal (CA); Emmanuel Sabourin, Uden (NL)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 16/167,224

(22) Filed: Oct. 22, 2018

(51) Int. Cl.
*G06Q 10/08* (2012.01)
*G06Q 10/06* (2012.01)
*G06N 20/00* (2019.01)

(52) U.S. Cl.
CPC ........... *G06Q 10/087* (2013.01); *G06N 20/00* (2019.01); *G06Q 10/0635* (2013.01); *G06Q 10/06313* (2013.01)

(58) Field of Classification Search
None
See application file for complete search history.

(56) References Cited

U.S. PATENT DOCUMENTS

| | | | |
|---|---|---|---|
| 7,398,232 B2* | 7/2008 | Renz | G06Q 10/087 705/28 |
| 2015/0227868 A1* | 8/2015 | Saraf | G06Q 10/0635 705/7.28 |
| 2016/0110657 A1* | 4/2016 | Gibiansky | G06N 20/00 706/12 |

* cited by examiner

*Primary Examiner* — Paul Danneman
(74) *Attorney, Agent, or Firm* — Spencer Fane LLP; Steven J. Laureanti

(57) ABSTRACT

A system and method are disclosed for receiving only historical supply chain data from an archiving system for one or more supply chain entities storing items at stocking locations, predicting one or more supply chain events during a prediction period by applying a prediction model to a sample of historical supply chain data, calculating an occurrence risk score for at least one of the one or more supply chain events and indicating a possibility that the at least one of the one or more supply chain events will occur, generating one or more alerts identifying at least one item and at least one alert stocking location, rendering an alert heatmap visualization comprising one or more selectable user interface elements, and provide one or more tools for initiating corrective actions to be undertaken in order to resolve one or more underlying causes of the at least one alert supply chain event.

20 Claims, 19 Drawing Sheets

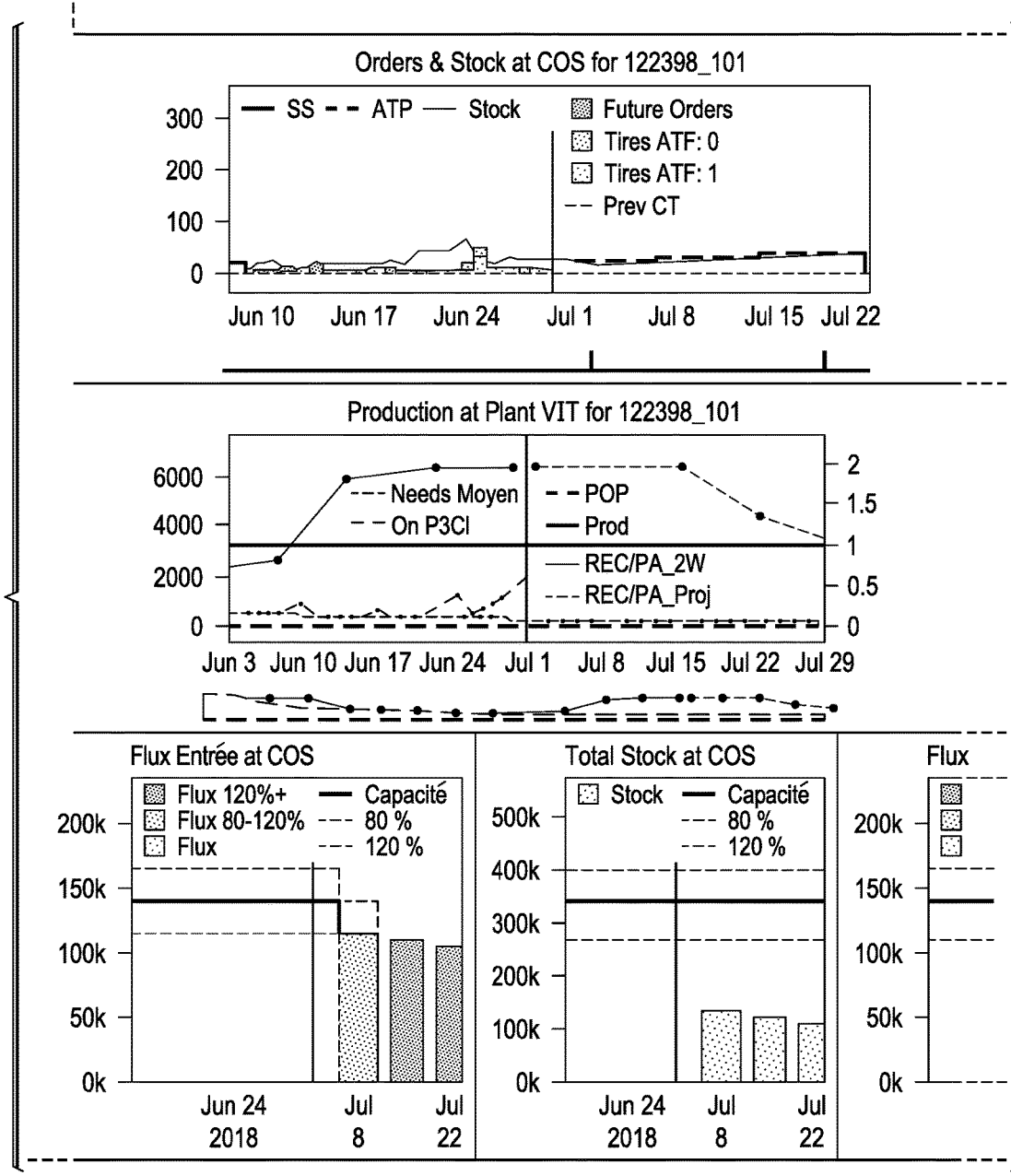

SYSTEM AND METHOD TO PREDICT SERVICE LEVEL FAILURE IN SUPPLY CHAINS

TECHNICAL FIELD

The present disclosure relates generally to supply chain management and specifically to systems and methods for predicting and resolving service level failures in a supply chain.

BACKGROUND

Although a goal of supply chain planning is to generate globally-optimized supply chain plans for an entire business, the calculation and execution of supply chain plans is typically controlled by several distinct and dissimilar processes, including, for example, demand planning, production planning, supply planning, distribution planning, execution, and the like. Each of these processes may have differing data requirements and planning periods which makes synchronizing the processes difficult. Often a demand or production variation is detected after the planning period of one or more processes and prevents generating a globally-optimized plan that accounts for the variation. The failure to account for variation in the globally optimized plan may cause service failures and prevents achieving customer service level targets. This result is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIGS. 3A-F illustrate a master visualization dashboard, according to an embodiment;

DETAILED DESCRIPTION

Figure 1:
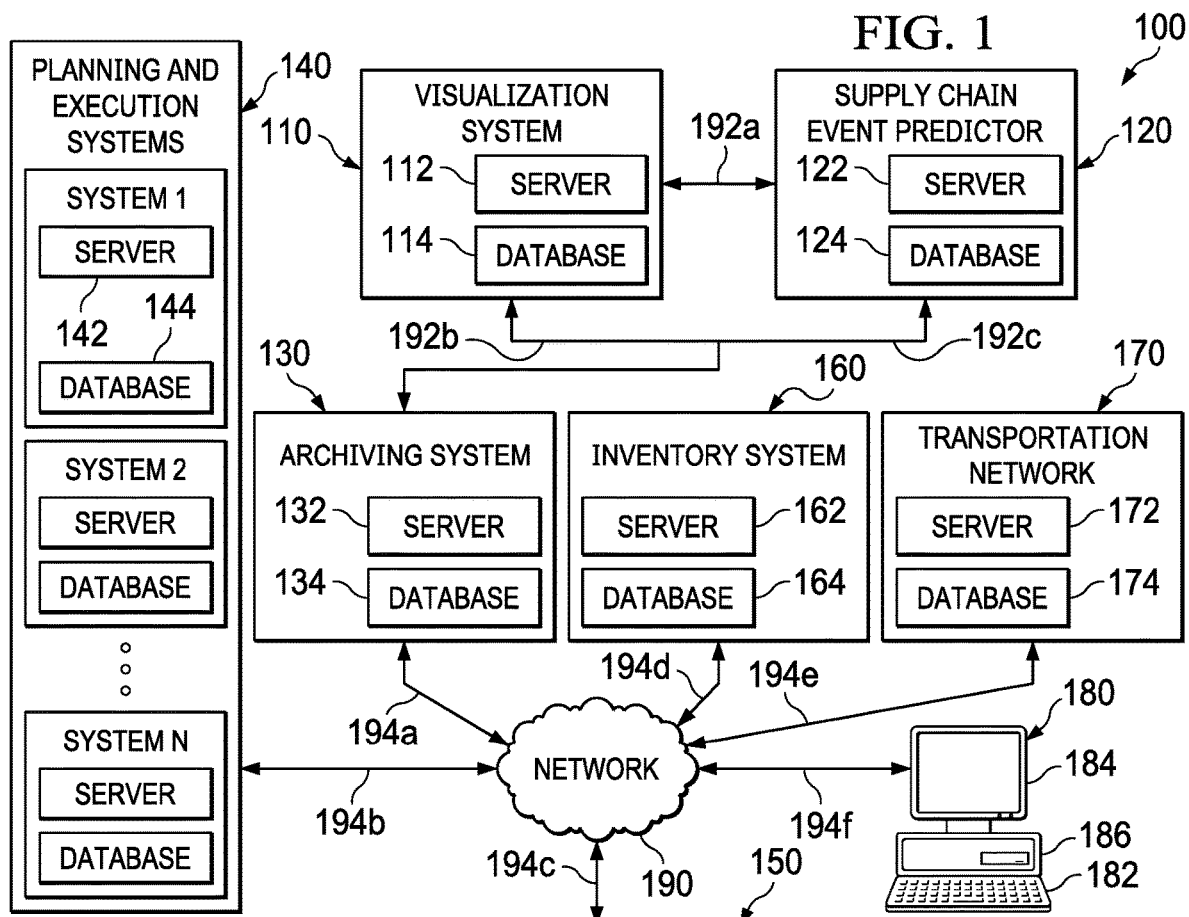
FIG. 1 illustrates an exemplary supply chain network, according to an embodiment.
Figure 1:
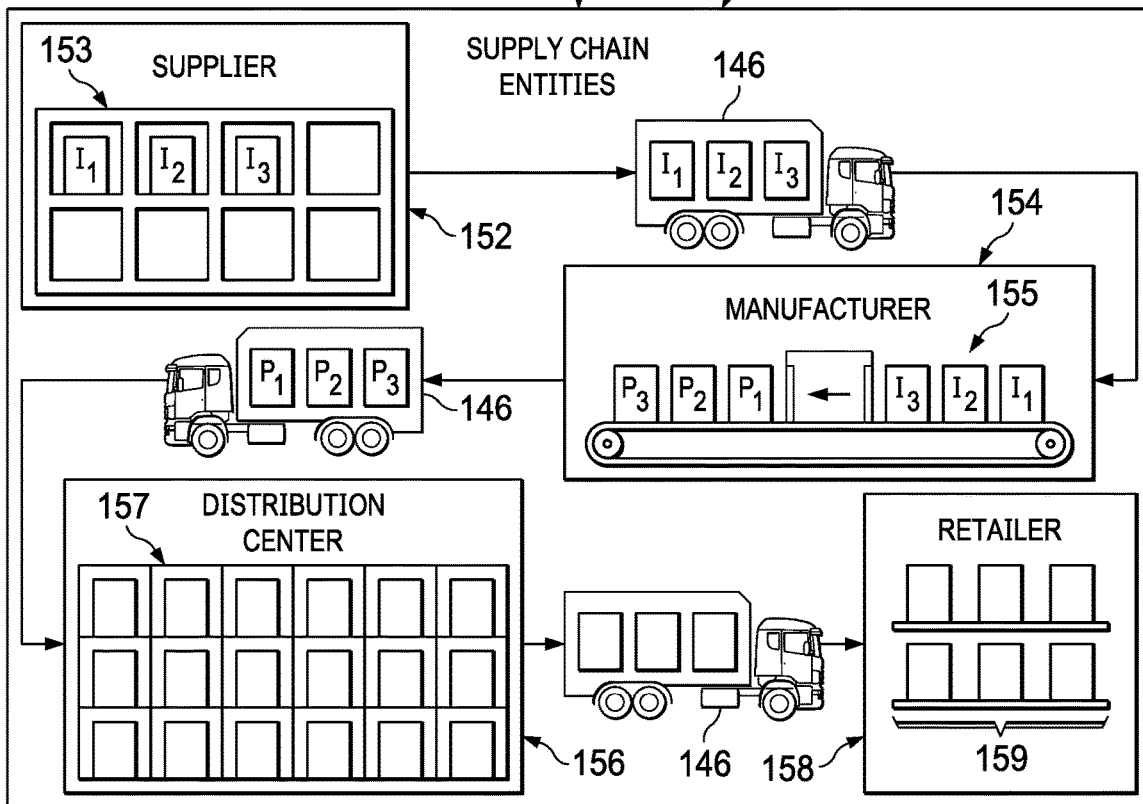

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Supply chains often fail to fully meet the intended targets set by a supply chain plan or may need to adjust to elements that had not been forecasted in the initial plan. Each of the supply chain planning and execution processes may have differing data requirements and planning periods which prevents fully synchronizing the various planning and execution processes of the supply chain. When particular events occur, such as a sudden change in demand or production, a transportation delay, and/or one or more shipping problems, the events may be detected too late to generate a new plan that accounts for the event. However one or more supply chain planners may still be able to take actions that would prevent a failure that would otherwise be caused by the event. As such, with a system that identifies events within the planning horizon a business may take a prescriptive approach (preventing problems before they occur) as opposed to what is ordinarily done, where a business reacts to failures only once they have already occurred.

Embodiments disclosed below apply machine learning techniques to archived supply chain data to predict supply chain failures before they occur, generate alerts and contextual visualizations that identify the underlying causes of the predicted failures, and provide situational awareness of the past and predicted state of the supply chain affected by the predicted failure. Some embodiments of the disclosed system provide for a single interface that generates alerts for predicted supply chain failures without using real-time data and without access to production system or transportation management system rules. As described in more detail below, by using only historical supply chain data, embodiments predict supply chain failures without aligning data or event models and without integration with planning and execution processes, which reduces computational run time of the computer processing and implementation time and costs.

FIG. 1 illustrates exemplary supply chain network 100, according to an embodiment. Supply chain network 100 comprises visualization system 110, supply chain event predictor 120, archiving system 130, one or more planning and execution systems 140, one or more supply chain entities 150, inventory system 160, transportation network 170, computer 180, network 190, and communication links 192*a*-192*c* and 194*a*-194*f*. Although a single visualization system 110, a single supply chain event predictor 120, a single archiving system 130, one or more planning and execution systems 140, one or more supply chain entities 150, a single inventory system 160, a single transportation network 170, a single computer 180, and a single network 190, are shown and described, embodiments contemplate any number of visualization systems, supply chain event predictors, archiving systems, one or more planning and execution systems, supply chain entities, inventory system, transportation network, computers, or networks, according to particular needs.

In one embodiment, visualization system 110 comprises server 112 and database 114. As explained in more detail below, server 112 comprises one or more modules that receive predictions for service level failures and generate alerts that identify the item, location, and time when a service level failure is predicted to occur. According to embodiments, visualization system 110 provides a visualization user interface (UI) that filters, hides, and sorts alerts to prioritize alerts related to, for example, important customers, high-value or large-volume products, and de-prioritize alerts that are redundant or unneeded. In addition, visualization system 110 displays contextual supply chain data that provides situational awareness of the past and predicted state of one or more supply chain entities 150 associated with each alert. For example, when an alert is selected using the visualization UI, visualization system 110 displays charts, graphs, data, and the like which summarize and elaborate on one or more aspects of the variables used to predict the service level failure identified by the selected alert, which may include, for example, order timing and quantity, inventory levels, the quantity or percentage of on-time shipments, and other supply chain measurements, as described in more detail below. According to embodiments, visualization system 110 receives service level failure predictions from supply chain event predictor 120, as described in more detail below.

In one embodiment, supply chain event predictor 120 comprises server 122 and database 124. Server 122 of supply chain event predictor 120 comprises one or more modules that model predictions of supply chain events, such a service level failure, as a classification problem using a machine learning model (such as, for example, a gradient boosted trees machine learning model, neural networks, and the like), trains the model with snapshots of historical supply chain data retrieved from archiving system 130, and predicts supply chain events for future time periods by applying snapshots of recent supply chain data to the trained model. Supply chain event predictor 120 transmits the supply chain event predictions to visualization system 110 which generates and displays alerts based on the supply chain events. As described in more detail below, supply chain event predictor 120 predicts supply chain events, such as service level failures or order promising failures, that occur too late to be included on a current plan but before the time period covered by the next plan.

As discussed above, supply chain event predictor 120 predicts the supply chain events using only historical supply chain data. According to embodiments, supply chain event predictor 120 retrieves the historical supply chain data from database 134 of archiving system 130 and stores the historical supply chain data at database 124. Supply chain event predictor 120 may process, transform, and normalize the historical supply chain data to prepare the data for use with one or more machine learning models. After the historical supply chain data is processed, supply chain event predictor 120 applies machine learning techniques to the processed historical supply chain data to predict future supply chain events, including, for example, service level failures, future stock outs, returns, and the like. As described in more detail below, supply chain event predictor 120 generates the prediction for the supply chain event much earlier than the event is predicted to occur, which provides an opportunity for one or more supply chain entities 150 to resolve the supply chain event by initiating one more levers, such as, for example, changing safety stock, adjusting a forecast, and the like.

Archiving system 130 of supply chain network 100 comprises server 132 and database 134. Although archiving system 130 is shown as comprising a single server 132 and a single database 134, embodiments contemplate any suitable number of servers or databases internal to or externally coupled with archiving system 130. Server 132 of archiving system 130 may support one or more processes for receiving historical supply chain data from one or more supply chain planning and execution processes 140. Historical supply chain data may include, for example, sales data, forecast data, stock levels, safety stock levels, forecast production, logistics operations, such as, for example, the predicted time to ship a product from a first location to a second location, actual shipping times for past shipments, production plans, actual production, store data (including sales numbers (e.g. number of sales over the past week), the start level at the store, the quality of the forecasts for a store), data from one or more planning and execution systems 140, including, for example, a transportation management system (TMS), a warehouse management system (WMS), fulfillment system, procurement system, production systems, and the like.

Server 132 may store the received historical supply chain data in database 134. Database 134 of archiving system 130 may comprise one or more databases or other data storage arrangement at one or more locations, local to, or remote from, server 132 storing supply chain data of the supply chain network 100.

According to an embodiment, one or more planning and execution systems 140 comprise server 142 and database 144. As described above, supply chain planning and execution is typically performed by several distinct and dissimilar processes, including, for example, demand planning, production planning, supply planning, distribution planning, execution, transportation management, warehouse management, fulfilment, and the like. Server 142 of one or more planning and execution systems 140 comprises one or more modules, such as, for example, a planning module, a solver, a modeler, and/or an engine, for performing actions of one or more planning and execution processes. Server 142 stores and retrieves supply chain data from database 144 or from one or more locations in supply chain network 100. In addition, one or more planning and execution systems 140 operate on one or more computers 180 that are integral to or separate from the hardware and/or software that support archiving system 130, one or more supply chain entities 150, inventory system 160, and transportation network 170.

Inventory system 160 comprises server 162 and database 164. Server 162 of inventory system 160 is configured to receive and transmit item data, including item identifiers, pricing data, attribute data, inventory levels, and other like data about one or more items at one or more locations in the supply chain network 100. Server 162 stores and retrieves item data from database 164 or from one or more locations in supply chain network 100. Each item may be represented in supply chain network 100 by an identifier, including, for example, Stock-Keeping Unit (SKU), Universal Product Code (UPC), serial number, barcode, tag, a radio-frequency identification (RFID) tag, or like objects that encode identifying information and which may be scanned to read the encoded information and at least partially identified based on the scan. This may include, for example, a stationary scanner located at one or more supply chain entities 150 that scans items as the items pass near the scanner such as, for example, a point of sale system at one or more retailers that records transactions and associates the transactions with product data, including, for example, associating customer identity information, store identity and location, market information, time information, price information, discount information, and the like, as described in more detail herein. Embodiments also include, for example, a scanner located at one or more stocking locations of one or more supply chain entities 150 that automatically identifies when an item is received into or removed from the one or more stocking locations.

Transportation network 170 comprises server 172 and database 174. According to embodiments, transportation network 170 directs one or more transportation vehicles to ship one or more items between one or more supply chain entities 150, based, at least in part, on a predicated supply chain event, predicted order promise failure, predicted service level failure, an inventory policy, target service levels, the number of items currently in stock at one or more supply chain entities 150, the number of items currently in transit in the transportation network 170, forecasted demand, a supply chain disruption, and/or one or more other factors described herein. Transportation vehicles comprise, for example, any number of trucks, cars, vans, boats, airplanes, unmanned aerial vehicles (UAVs), cranes, robotic machinery, or the like. Transportation vehicles may comprise radio, satellite, or other communication that communicates location information (such as, for example, geographic coordinates, distance from a location, global positioning satellite (GPS) information, or the like) with visualization system 110, supply chain event predictor 120, archiving system 130, one or more planning and execution systems 140, one or more supply chain entities 150, and/or inventory system 160, to identify the location of the transportation vehicle and the location of any inventory or shipment located on the transportation vehicle.

As shown in FIG. 1, supply chain network 100 operates on one or more computers 180 that are integral to or separate from the hardware and/or software that support visualization system 110, supply chain event predictor 120, archiving system 130, one or more planning and execution systems 140, one or more supply chain entities 150, inventory system 160, and transportation network 170. Supply chain network 100 comprising visualization system 110, supply chain event predictor 120, archiving system 130, one or more planning and execution systems 140, one or more supply chain entities 150, inventory system 160, and transportation network 170 may operate on one or more computers 160 that are integral to or separate from the hardware and/or software that support visualization system 110, supply chain event predictor 120, archiving system 130, one or more planning and execution systems 140, one or more supply chain entities 150, inventory system 160, and transportation network 170. Computers 180 may include any suitable input device 182, such as a keypad, mouse, touch screen, microphone, or other device to input information. Output device 184 may convey information associated with the operation of supply chain network 100, including digital or analog data, visual information, or audio information. Computer 180 may include fixed or removable computer-readable storage media, including a non-transitory computer readable medium, magnetic computer disks, flash drives, CD-ROM, in-memory device or other suitable media to receive output from and provide input to supply chain network 100.

Computer 180 may include one or more processors 186 and associated memory to execute instructions and manipulate information according to the operation of supply chain network 100 and any of the methods described herein. In addition, or as an alternative, embodiments contemplate executing the instructions on computer 180 that cause computer 180 to perform functions of the method. Further examples may also include articles of manufacture including tangible non-transitory computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from visualization system 110, supply chain event predictor 120, archiving system 130, one or more planning and execution systems 140, one or more supply chain entities 150, inventory system 160, and transportation network 170. In addition, each of the one or more computers 180 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the visualization system 110, supply chain event predictor 120, archiving system 130, one or more planning and execution systems 140, one or more supply chain entities 150, inventory system 160, and transportation network 170. These one or more users may include, for example, a "manager" or a "planner" handling supply chain event prediction, service level failure prediction, supply chain planning, actions following supply chain events, actions in response to alerts for predicted supply chain events, and/or one or more related tasks within supply chain network 100. In addition, or as an alternative, these one or more users within supply chain network 100 may include, for example, one or more computers programmed to autonomously handle, among other things, determining an assortment plan, demand forecasting demand, supply and distribution planning, inventory management, allocation planning, order fulfilment, adjustment of manufacturing and inventory levels at various stocking points and distribution centers, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Suppliers 152 may comprise automated distribution systems 153 that automatically transport products to one or more manufacturers 154 based, at least in part, on one or more predicted supply chain events, one or more predicted supply chain failures, one or more corrective actions initiated to resolve a predicted event or failure, one or more alerts, and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, on one or more predicted supply chain events, one or more predicted supply chain failures, one or more corrective actions initiated to resolve a predicted event or failure, one or more alerts, and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in supply chain network 100 and store and transport the product for a second one or more supply chain entities 150. Distribution centers 156 may comprise automated warehousing systems 157 that automatically remove products from and place products into inventory based, at least in part, on one or more predicted supply chain events, one or more predicted supply chain failures, one or more corrective actions initiated to resolve a predicted event or failure, one or more alerts, and/or one or more other factors described herein.

Retailers 158 may be any suitable entity that obtains one or more products to sell to one or more customers. Retailers 158 may comprise any online or brick-and-mortar store, including stores with shelving systems 159. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 158 based on computer-generated instructions or automatically by machinery to place products in a desired location in retailers 158 and which may be based, at least in part, on one or more predicted supply chain events, one or more predicted supply chain failures, one or more corrective actions initiated to resolve a predicted event or failure, one or more alerts, and/or one or more other factors described herein. Although one or more supply chain entities 150 are shown and described as separate and distinct entities, the same entity may simultaneously act as any one of the one or more supply chain entities 150. For example, one or more supply chain entities 150 acting as a manufacturer can produce a product, and the same one or more supply chain entities 150 can act as a supplier to supply an item to itself or another one or more supply chain entities 150. Although one example of a supply chain network 100 is shown and described, embodiments contemplate any configuration of supply chain network 100, without departing from the scope described herein.

In one embodiment, visualization system 110 may be coupled with supply chain event predictor 120 using communication link 192a and archiving system 130 using communication link 192b, which may be any wireline, wireless, or other link suitable to support data communications between visualization system 110, supply chain event predictor 120, and archiving system 130 during operation of the system. Supply chain event predictor 120 may be coupled with visualization system 110 using communication link 192a and archiving system 130 using communication link 192c, which may be any wireline, wireless, or other link suitable to support data communications between visualization system 110, supply chain event predictor 120, and archiving system 130 during operation of the system. Archiving system 130 may be coupled with network 190 using communication link 194a, which may be any wireline, wireless, or other link suitable to support data communications between archiving system 130 and network 190 during operation of the system. One or more planning and execution systems 140 may be coupled with network 190 using communication link 194b, which may be any wireline, wireless, or other link suitable to support data communications between one or more planning and execution systems 140 and network 190 during operation of the system. One or more supply chain entities 150 may be coupled with network 190 using communication link 194c, which may be any wireline, wireless, or other link suitable to support data communications between one or more supply chain entities 150 and network 190 during operation of the system. Inventory system 160 may be coupled with network 190 using communication link 194d, which may be any wireline, wireless, or other link suitable to support data communications between inventory system 160 and network 190 during operation of the system. Transportation system 170 may be coupled with network 190 using communication link 194e, which may be any wireline, wireless, or other link suitable to support data communications between transportation system 170 and network 190 during operation of the system. Computer 180 may be coupled with network 190 using communication link 194f, which may be any wireline, wireless, or other link suitable to support data communications between computer 180 and network 190 during operation of the system.

Although communication links 194a-194f are shown as generally coupling archiving system 130, one or more planning and execution systems 140, one or more supply chain entities 150, inventory system 160, transportation network 170, and computer 180 to network 190, any of archiving system 130, one or more planning and execution systems 140, one or more supply chain entities 150, inventory system 160, transportation network 170, and computer 180 may communicate directly with each other, according to particular needs.

In another embodiment, network 190 includes the Internet and any appropriate local area networks (LANs), metropolitan area networks (MANs), or wide area networks (WANs) coupling archiving system 130, one or more planning and execution systems 140, one or more supply chain entities 150, inventory system 160, transportation network 170, and computer 180. For example, data may be maintained locally to, or externally of, archiving system 130, one or more planning and execution systems 140, one or more supply chain entities 150, inventory system 160, transportation network 170, computer 180 and made available to one or more associated users of archiving system 130, one or more planning and execution systems 140, one or more supply chain entities 150, inventory system 160, transportation network 170, and computer 180 using network 190 or in any other appropriate manner. For example, data may be maintained in a cloud database at one or more locations external to visualization system 110, supply chain event predictor 120, archiving system 130, one or more planning and execution systems 140, one or more supply chain entities 150, inventory system 160, transportation network 170, and computer 180 and made available to one or more associated users of visualization system 110, supply chain event predictor 120, archiving system 130, one or more planning and execution systems 140, one or more supply chain entities 150, inventory system 160, transportation network 170, and computer 180 using the cloud or in any other appropriate manner. Those skilled in the art will recognize that the complete structure and operation of network 190 and other components within supply chain network 100 are not depicted or described. Embodiments may be employed in conjunction with known communications networks and other components.

In accordance with the principles of embodiments described herein, visualization system 110 may generate alerts for predicted supply chain events, such as an order promising failure or service level failure, that will occur during a current or future period but which will not be accounted for in a supply chain plan. Based on the alert, a supply chain planner accessing one or more planning and execution systems 140 may initiate an action to correct the supply chain event. Based on the selected corrective action, the one or more planning and execution systems 140 may adjust forecasts, inventory levels at various stocking points, production of products of manufacturing equipment, proportional or alternative sourcing of one or more supply chain entities, and the configuration and quantity of packaging and shipping of products and taking into account the current inventory or production levels at one or more supply chain entities 150. For example, the selected corrective action to resolve a supply chain failure associated with an alert generated by the visualization system 110 may comprise adding items to or removing items from a shipment of one or more supply chain entities 150.

Figure 2:
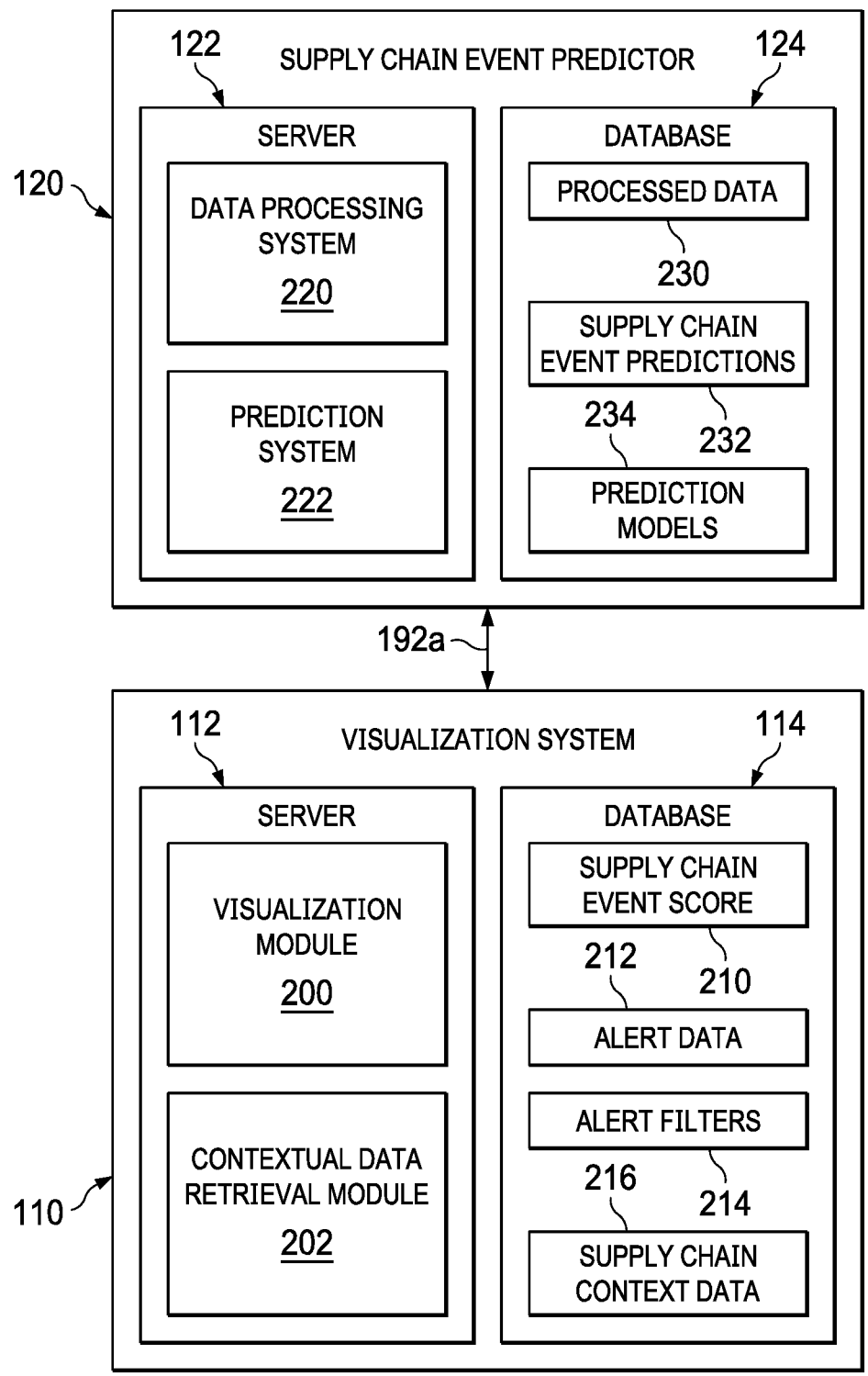
FIG. 2 illustrates the visualization system and the supply chain event predictor of FIG. 1 in more detail, in accordance with an embodiment.
Figure 3A:
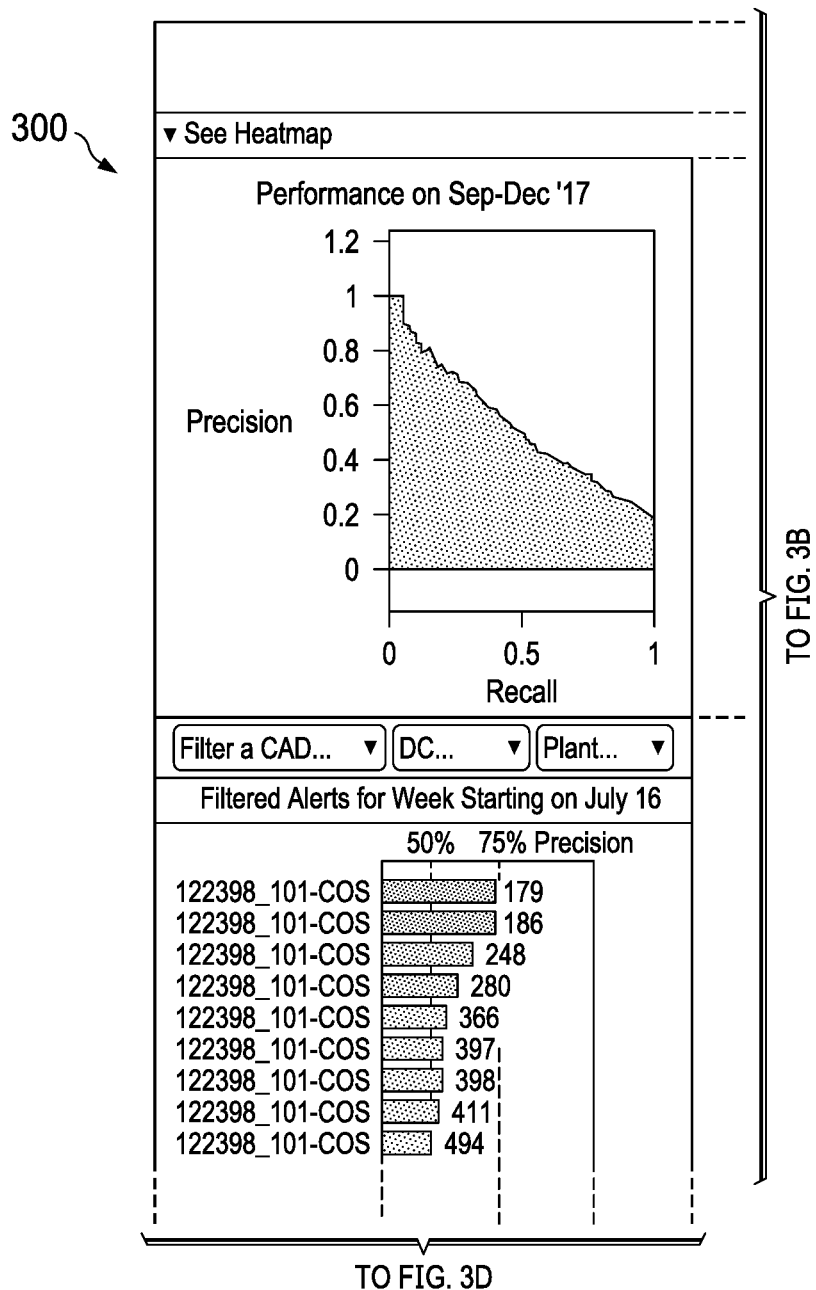
Figure 3B:
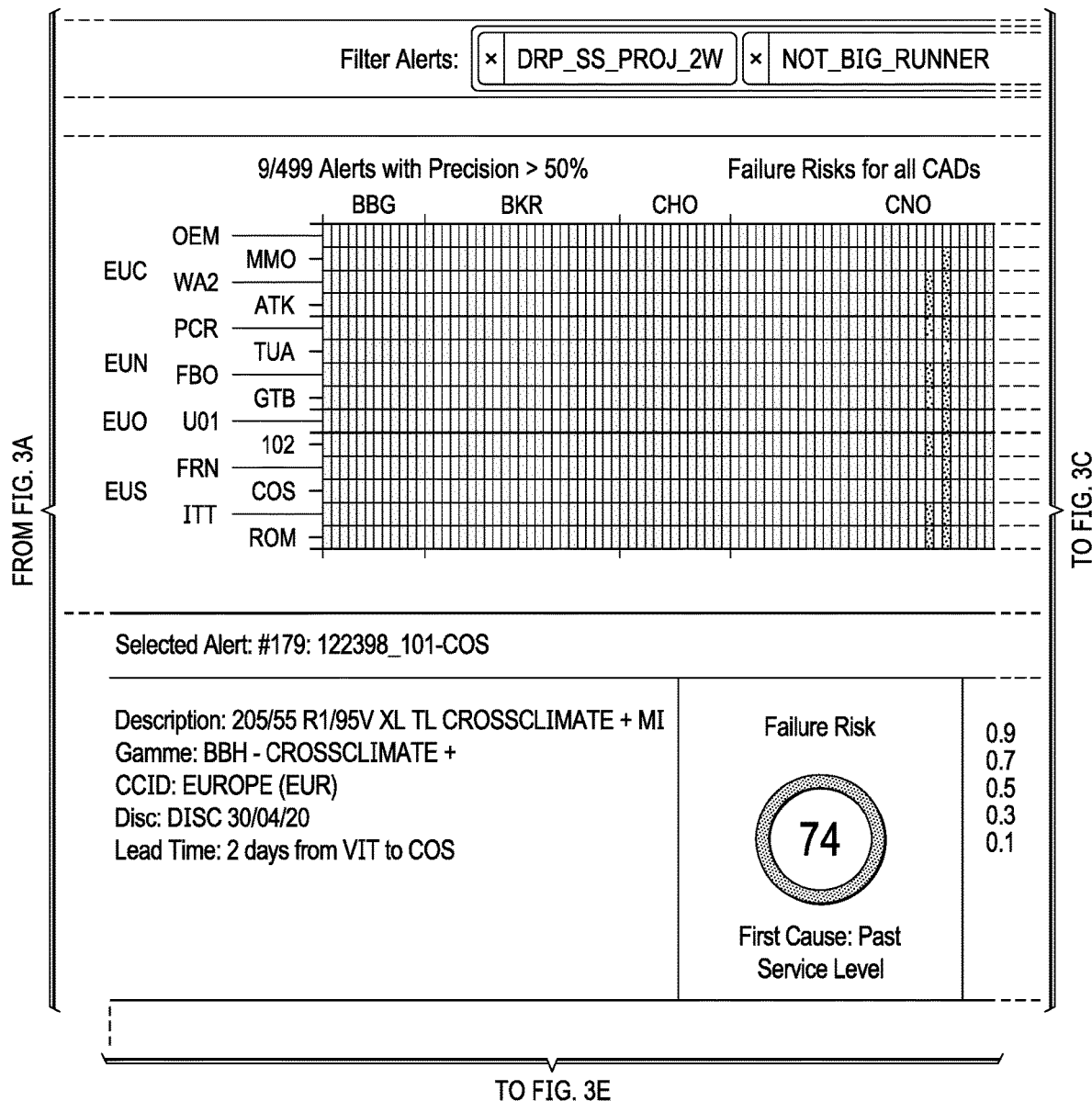
Figure 3C:
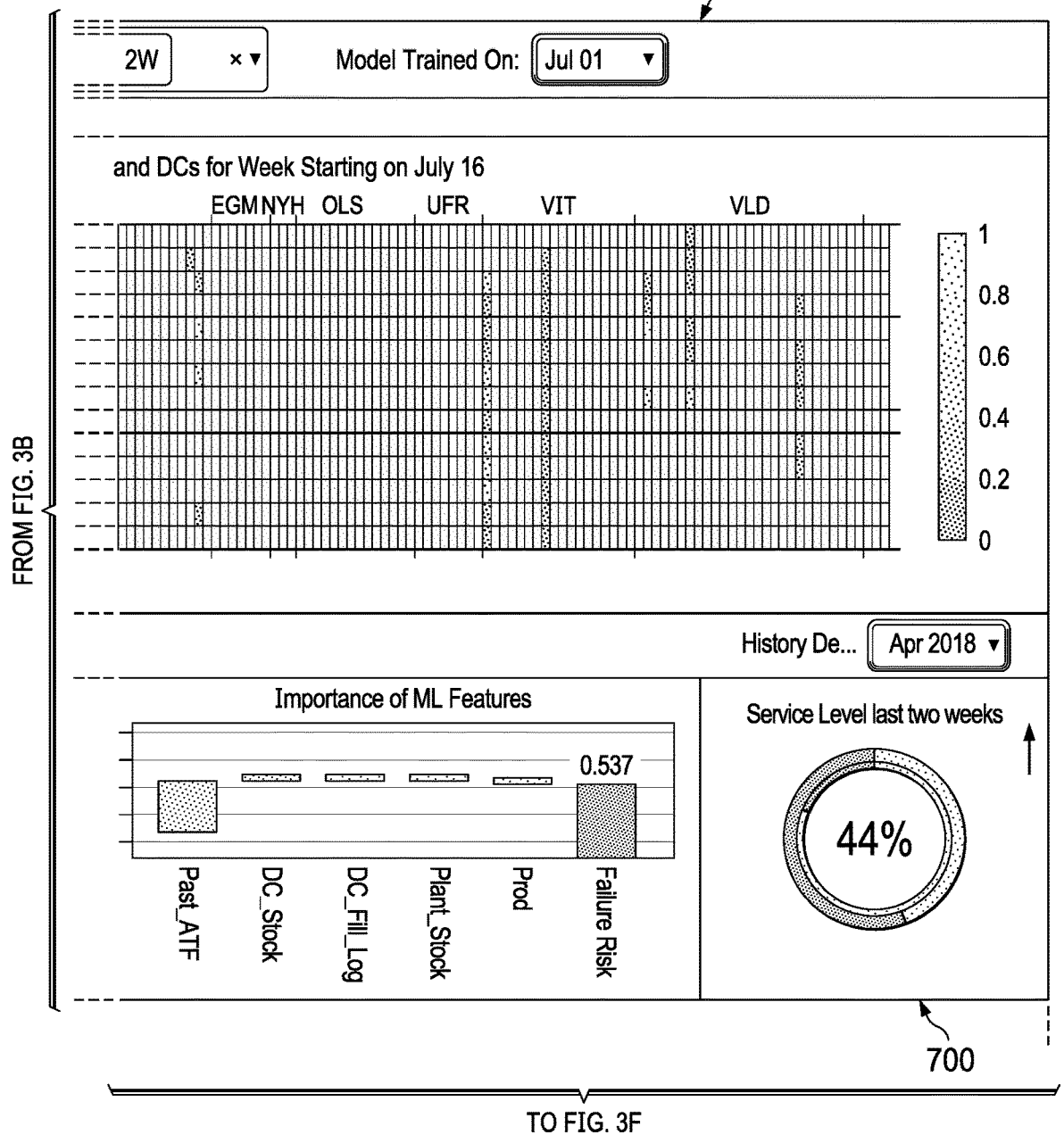
Figure 3D:
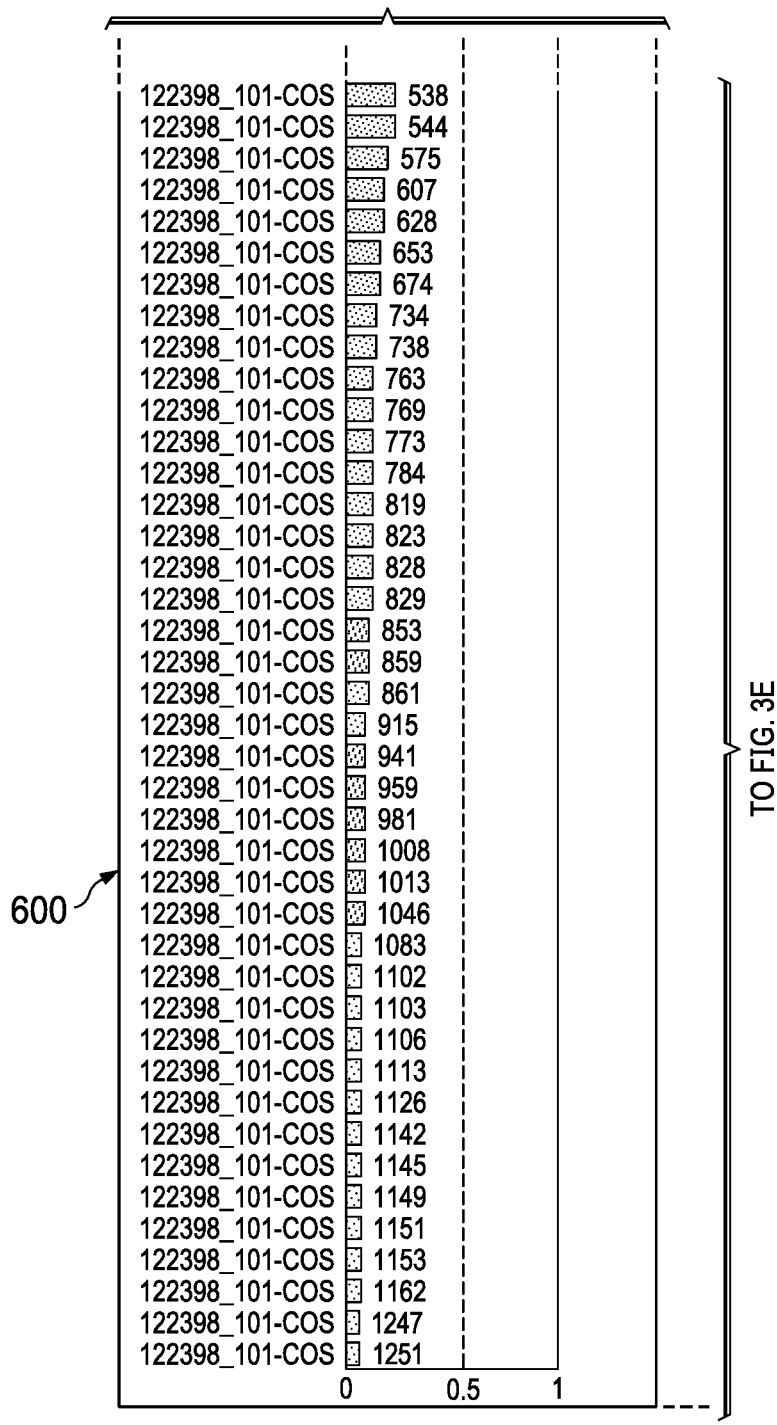
Figure 3F:
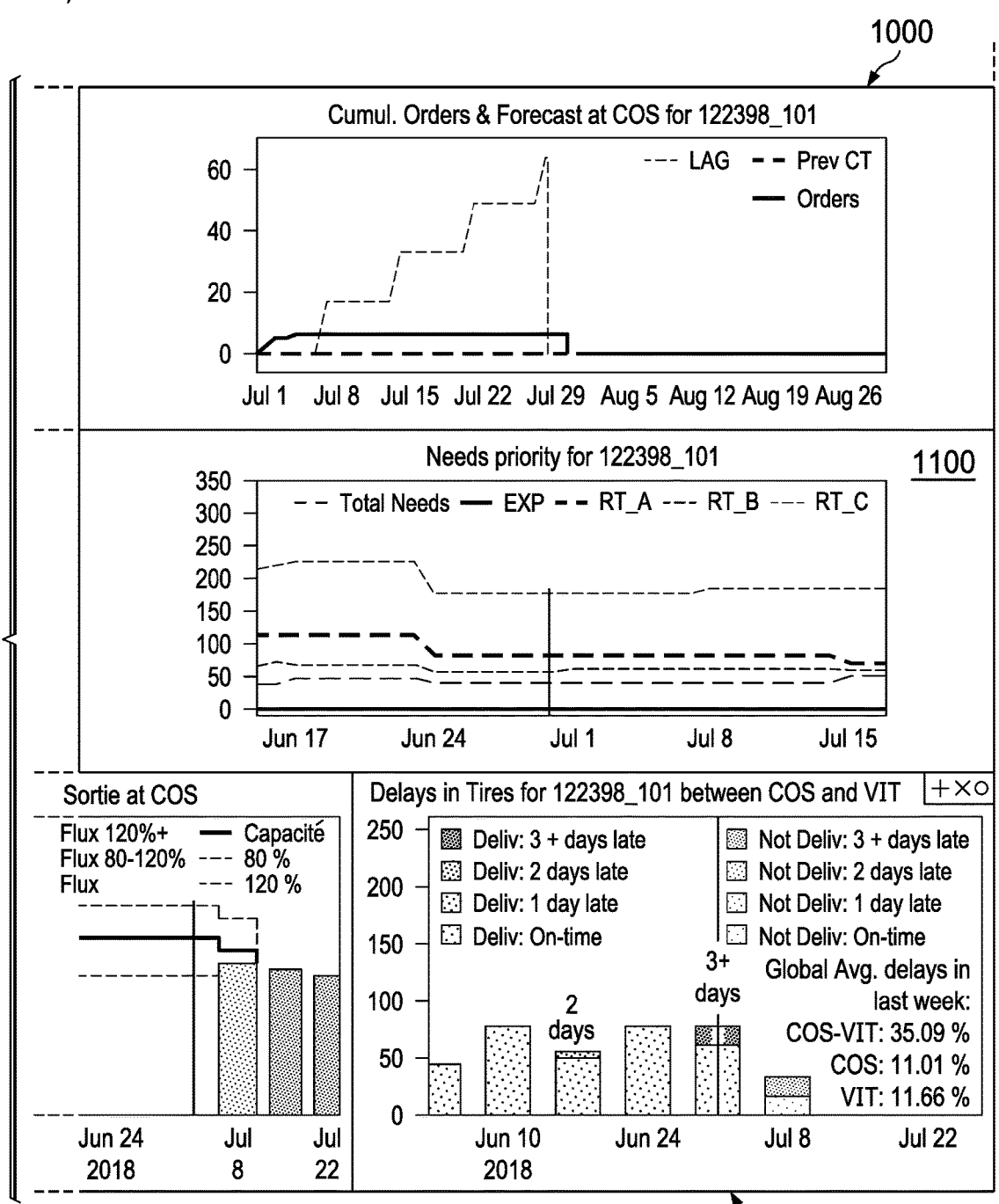

FIG. 2 illustrates visualization system 110 and supply chain event predictor 120 of FIG. 1 in more detail, in accordance with an embodiment. Visualization system 110 may comprise server 112 and database 114, as discussed above. Although visualization system 110 is shown as comprising a single server 112 and a single database 114, embodiments contemplate any suitable number of servers or databases internal to or externally coupled with visualization system 110.

Server 112 of visualization system 110 comprises visualization module 200 and contextual data retrieval module 202. Although server 112 is shown and described as comprising a single visualization module 200 and a single contextual data retrieval module 202, embodiments contemplate any suitable number or combination of these located at one or more locations, local to, or remote from visualization system 110, such as on multiple servers or computers at one or more locations in supply chain network 100.

Database 114 of visualization system 110 may comprise one or more databases or other data storage arrangement at one or more locations, local to, or remote from, server 112. Database 114 of visualization system 110 comprises, for example, supply chain event scores 210, alert data 212, alert filters 214, and supply chain context data 216. Although database 114 is shown and described as comprising supply chain event scores 210, alert data 212, alert filters 214, and supply chain context data 216, embodiments contemplate any suitable number or combination of these, located at one or more locations, local to, or remote from, visualization system 110 according to particular needs.

In one embodiment, visualization module 200 of visualization system 110 comprises a visualization user interface (UI), including a graphical user interface (GUI), that displays one or more interactive visualizations including, for example, a heatmap showing the occurrence risk of predicted supply chain events, production location of an item associated with the event, and distribution region for the item. Visualization module 200 may also generate and display visualisations that include graphs, charts, and other graphics illustrating supply chain metrics associated with the predicted supply chain events, probabilities that the supply chain events will occur, and the importance of various factors in determining the occurrence probabilities. The visualizations are constructed from data received from the supply chain event predictor 120 and is updated with contextual data from the contextual data retrieval module 202.

In one embodiment contextual data retrieval module 202 of visualization system 110 retrieves contextual data for display in one or more visualizations of master visualization dashboard 300 and stores the retrieved contextual data as supply chain context data 216 of database 114. Contextual data retrieval module 202 identifies historical supply chain data associated with one or more features used by the supply chain event predictor 120 to predict a supply chain event, (i.e. the values of the features increase or decrease the probability of occurrence of predicted supply chain events), retrieves the identified data from visualization system 110, supply chain event predictor 120, and/or archiving system 130, and stores the data as supply chain context data 216. In addition, contextual data retrieval module 202 may identify one or more supply chain components associated with a predicted supply chain event such as, for example, a SKU, a stocking location, one or more supply chain entities 150, a distribution channel, a sales region, a resource, a material, or the like, and retrieve data associated with the predicated supply chain event from one or more of database 114 of visualization system 110, database 124 of supply chain predictor 120, archive database 134 of archiving system 130, and/or one or more other locations local to or remote from supply chain network 100. Visualization module 200 processes the retrieved contextual data to create visualizations illustrating various aspects of the variables used to make the supply chain event predictions and provide context of the past, current, and future states of the supply chain network 100.

The various types of data stored in database 114 of visualization system 110 will now be discussed.

Supply chain event scores 214 comprise the calculated probabilities that one or more supply chain events will occur. Supply chain event predictor 120 may calculate the probability that a particular supply chain event will occur using the processed data 230 and supply chain event predictions 232, as discussed in more detail below. Supply chain event predictor 120 analyzes values generated by the prediction problem and calculates the probability that the target will be met based on the performance of previous prediction values for predicting supply chain events using that particular prediction model. When calculating the performance of the model, supply chain event predictor 120 uses the performance to update the occurrence probabilities for the predicated supply chain events. By way of example and not by way of limitation, visualization system 110 may calculate the probabilities of occurrence for a supply chain event comprising a service level failure, such as that caused by failing to meet a promised delivery time, by analyzing past performance of calculations made during prediction phases of a machine learning process. The probability of occurrence for a supply chain failure may be termed a failure risk, as discussed in more detail below.

Alert data 216 comprises alerts generated by supply chain event predictor 120. According to embodiments, visualization system 110 displays one alert element for each unique combination of item and stocking location that is predicted to cause a service level failure during the prediction period. As described in more detail below, the item-stocking location combination of the alert is used to create a visualization of alert elements that is ordered across one axis by SKU and across a second axis by a location. Although alerts are described as being generated for each unique item/stocking location combination that is predicted to cause a service level failure, embodiments contemplate alerts generated for each SKU or other characteristic or combination of characteristics of predicted supply chain events.

Alert filters 218 comprise a set of rules or, by way of example, a file which for each item location combination presents a list of already known facts which cause visualization system 110 to deprioritize or not display alerts for one or more supply chain events based on the criteria associated with the selected filter. According to some embodiments, alert filters 218 removes alerts for one or more supply chain events that are detected by one or more planning and execution systems 140 or will be accounted for in a future planning session. By way of example and not of limitation, visualization system 110 may filter and automatically hide alerts when, for example, the alerts are seen by other systems, alerts are for high manufacturing volumes of items, alerts indicate supply chain events that cannot be resolved because the corrective lever does not exist, and the like.

Supply chain context data 220 comprises data retrieved by contextual data retrieval module 212 of visualization system 110, as discussed above. Supply chain context data 220 may include, for example, data that increases or decreases the probability of occurrence of one or more supply chain events, data that supplements the supply chain event predictions, data illustrating various aspects of the variables used to make the supply chain event predictions, data regarding one or more components of a supply chain and which is associated with a supply chain event, and/or data used to calculate any of the foregoing or generated from any of the foregoing, including, for example, forecasts, calculations, or statistics generated from historical supply chain data.

Supply chain event predictor 120 may comprise server 122 and database 124. Although supply chain event predictor 120 is shown as comprising a single server 122 and a single database 124, embodiments contemplate any suitable number of servers or databases internal to or externally coupled with a supply chain event predictor 120.

Server 122 of supply chain event predictor 120 may comprise data processing system 220 and prediction system 222. Although server 122 is shown and described as comprising a single data processing system 220 and a single prediction system 222, embodiments contemplate any suitable number or combination of data processing system 220 and prediction system 222 located at one or more locations, local to, or remote from supply chain event predictor 120.

Database 124 of supply chain event predictor 120 may comprise one or more databases or other data storage arrangement at one or more locations, local to, or remote from, server 122. Database 124 comprises, for example, processed data 230, supply chain event predictions 232, and prediction models 234. Although, database 124 is shown and described as comprising processed data 230, supply chain event predictions 232, and prediction models 234, embodiments contemplate any suitable number or combination of these, located at one or more locations, local to, or remote from, supply chain event predictor 120 according to particular needs.

In one embodiment, data processing system 220 of supply chain event predictor 120 comprises one or more modules that receive historical supply chain data from archiving system 130 and prepares the data for a prediction problem, such as, for example, machine learning. The data is prepared for a prediction problem by, for example, aggregating the data at a particular granularity level, normalized to be quantity independent (wherein the supply chain data has the same meaning independent of the quantity of an item sold), and then rescaled to compare data of different scopes. According to embodiments, data processing system 220 transforms historical supply chain data by one or more rescaling, normalization, and/or transformation process to, for example, aggregate one or more variables (inventory level, forecast, logistics delays, production quantity, etc.) at the same granularity level; determining all actual, current, or past quantities in terms of a ratio of the original quantity divided by the plan quantity, computation of quantity independent key performance indicators (such as, for example, past service level in % per week), and the like.

Prediction system 222 may predict the supply chain event by modeling the occurrence of the supply chain event as a prediction problem using one or more prediction models 234. In one embodiment, the supply chain prediction problem may comprise a type of classification problem that predicts whether the service level will be above a target set by one or more supply chain entities 150. Prediction system 220 may solve the prediction problem comprising a classification problem using a suitable machine learning model.

In embodiments comprising a machine learning model, prediction system 220 receives samples of transformed historical supply chain data aggregated at a certain granularity level during a training phase. The granularity level may comprise, for example, data aggregated by item, stocking location, and time period for one or more planning periods, such as, for example, data aggregated by SKU-week, for a planning period of four-weeks. The transformed historical data aggregated at the item-stocking location-week level for the four-week planning period comprises a sample to train the supply chain event predictor 120 system, which is then presented with several snapshots of this data and presented with a prediction problem requiring predicting service level failures for a particular forward looking period. For example, the data processing and prediction system 220 may be trained by receiving one or more years of archived data, presented in four-week snapshots and requested to predict the service level failures in the three weeks after the time period covered by the snapshot. After training the machine learning model, prediction system 220 then predicts future service level failures for three weeks when presented with snapshots of four-week samples of supply chain data. According to some embodiments, the prediction phase of the machine learning process is performed at weekly intervals. However, embodiments contemplate shorter prediction phases that may be performed, for example, twice a week, once a day, or the like. In addition, prediction system 222 predicts supply chain events that occur only within a prediction horizon. According to embodiments, the prediction horizon comprises a length of time long enough for one or more supply chain entities 150 to enact a corrective action for the predicted supply chain event and shorter than the planning horizon. According to embodiments, prediction system 220 sets the prediction horizon to a time period shorter than a time period when supply chain events are predicted to happen during a planning period that will be captured and corrected by a planning system.

The various types of data stored in database 124 of supply chain event predictor 120 will now be discussed.

Processed data 230 comprises historical supply chain data processed by data processing system 220 of supply chain event predictor 120 for use by prediction system 222. The processed data may comprise data checked by data processing system 220 for correct range, sign, or value. Processed data 230 may also comprise statistics generated from the data. Additionally, processed data 230 may be transformed to adjust the scope to a certain granularity level, normalized to be quantity independent, where the supply chain data has the same meaning independent of the quantity of an item sold, and then rescaled to compare data of different scopes.

Supply chain event predictions 232 comprise events predicated to occur during a current or future time period when the value of a supply chain metric will not meet a selected targeted value. By way of example and not of limitation, a supply chain event may comprise an order promising failure that occurs when a business is unable to deliver an item within a promised time period.

Prediction models 234 may comprise machine learning models (including, for example, a gradient boosted trees machine learning model, a neural network model, and the like).

FIGS. 3A-3F illustrate master visualization dashboard 300, according to an embodiment. As discussed above, visualization module 210 displays alerts indicating whether a supply chain event (such as, for example, a service level failure) will occur during a prediction period. According to embodiments, master visualization dashboard 300 displays predictions of supply chain events using one or more visualisations that emphasize supply chain events with the largest impacts or the highest probability of occurring. Additionally, master visualization dashboard 300 provides contextual information that automatically updates to provide the state of one or more supply chain entities 150 associated with one or more supply chain events, which provides a centralized system for predicting and determining causes for various supply chain events without any direct interface with supply chain planning and execution systems 140.

According to embodiments, master visualization dashboard 300 comprises alert prediction overview 400 (FIGS. 4A-B), alert priority visualizer 600 (FIG. 6), selected alert overview 700 (FIG. 7), location overview visualization 1000 (FIG. 10), production overview visualization 1100 (FIG. 11), and logistics overview visualization 1200 (FIGS. 12A-B), as described in greater detail below.

According to embodiments, master visualization dashboard 300 displays alerts at both alert predication overview 400 and alert priority visualizer 600. As described in more detail below, visualization module 200 display alerts for supply chain events using only historical supply chain data. In a typical supply chain network, a production manager would receive alerts from the production system with rules developed in the production system, and logistics manager would receive alerts from the transportation management systems with rules developed in the transportation management system. However, visualization system 110 generates a master visualization dashboard 300 that predicts both production system alerts and transportation management system alerts for an entire supply chain network 100 in a single location, without real-time data or access to the production system rules or the transportation management system rules.

Figure 4A:
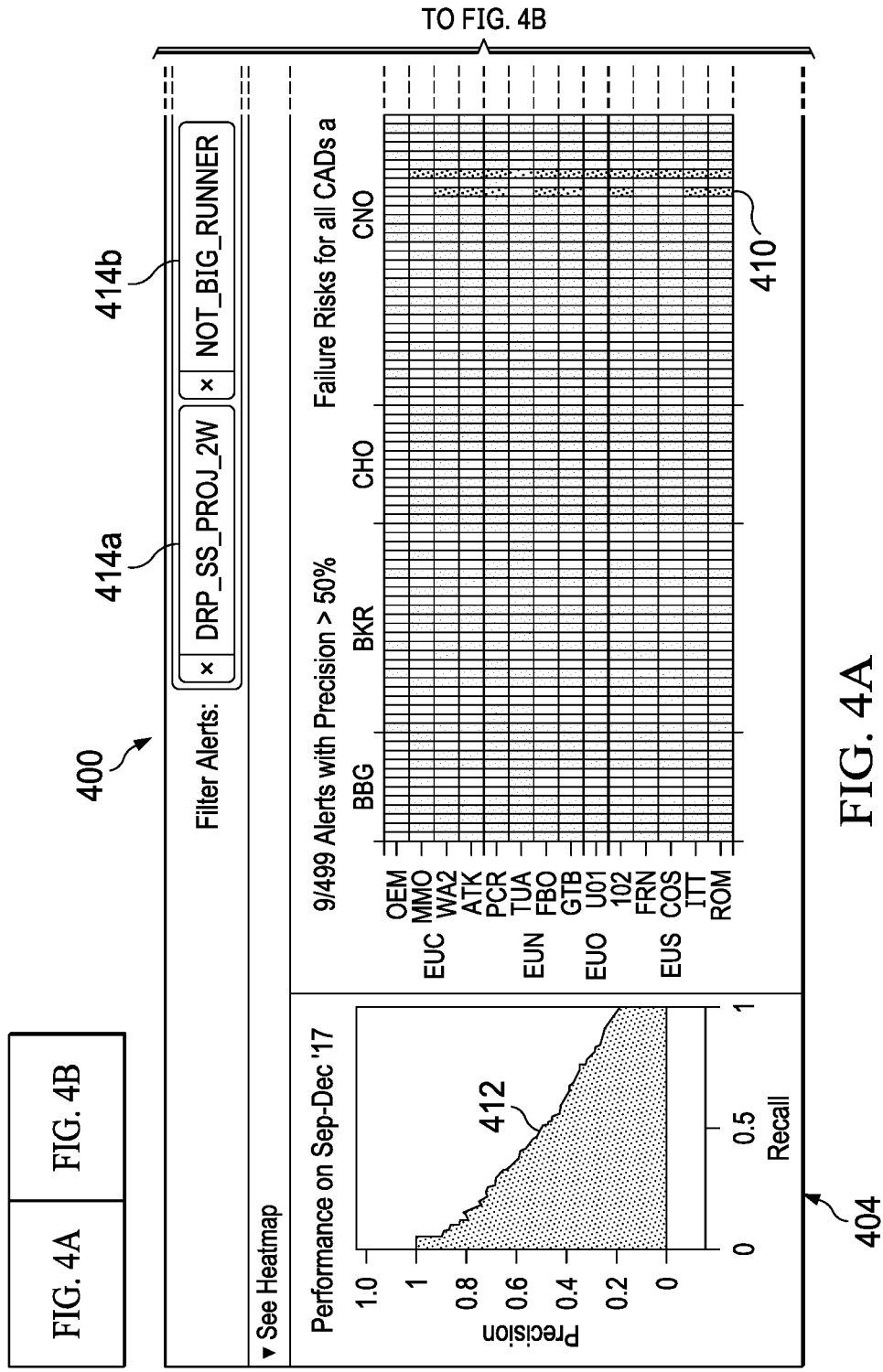
FIGS. 4A-B illustrate the alert prediction overview of FIGS. 3A-F in more detail, in accordance with an embodiment.
Figure 4B:
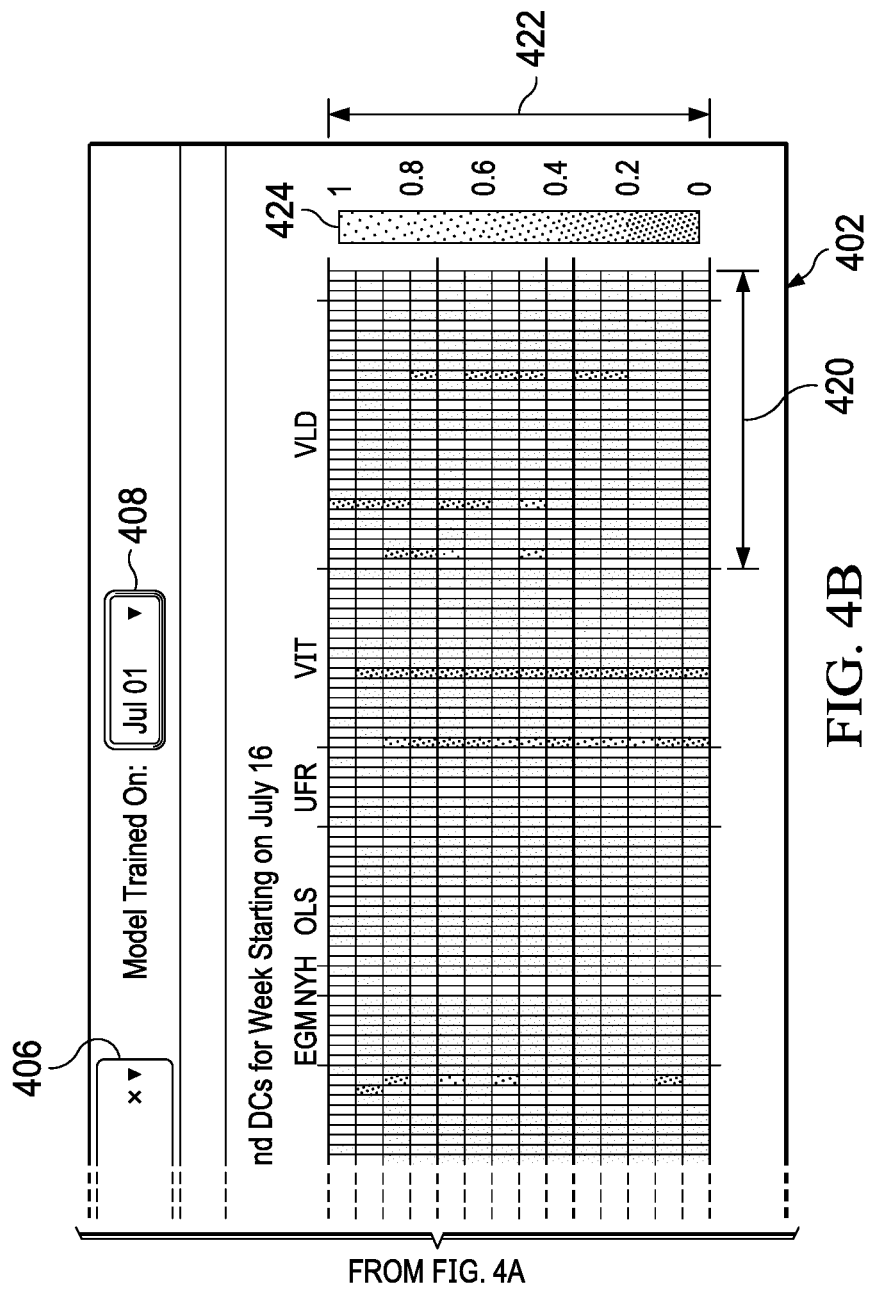

FIGS. 4A-B illustrate the supply chain alert prediction overview 400 of FIGS. 3A-F in more detail, in accordance with an embodiment. Supply chain alert prediction overview 400 comprises alert heatmap 402, model performance visualization 404, alert filter selector 406, and model version selector 408. Visualization system 110 generates an alert heatmap 402 comprising alert elements 410 that represent predicted supply chain events categorized by each unique combination of item identifier and stocking location and color-coded to indicate the probability that the predicted supply chain event will occur.

In addition, visualization module 200 may display the performance of the prediction model as model performance visualization 404. According to embodiments, model performance visualization 404 displays the performance of the model for a selected alert by plotting the corresponding precision and recall of the selected alert on a performance curve 412 and displaying the numerical values for the precision and recall measurements, which are used to calculate the occurrence probability for predicted supply chain events, the failure risk for predicted supply chain failures, and/or one or more other metrics described herein.

Alert filter selector 406 comprises an interactive element of the visualization UI providing for selection or input of filters that cause visualization system 110 to not display one or more alerts based on the criteria of the selected filter. Visualization system 110 displays selected active filters 414 in alert filter selector 406. One or more selected active filters 414 comprise filters currently being used by visualization system 110 to prioritize, hide, or display one or more alert elements 410 based on criteria in one or more selected active filters 414 and properties of the alerts represented by the alert elements 410, including, for example, the supply chain event, item, SKU, stocking location, one or more supply chain entities 150, time period, occurrence risk, or other property or value associated with the one or more alerts represented by the one or more alert elements 410.

Model version selector 408 comprises an interactive element of the visualization UI providing for selection of predictions from one or more different time periods. For example, model version selector 408 provides for displaying predictions from a previous week, from two weeks prior, a prior month, year, or the like. Although model version selector 408 is described as providing selection and display of predictions from particular time periods, embodiments contemplate selection and display of predictions from a particular hour, day, week, month, planning period, season, year, or any suitable time period.

According to some embodiments, alert heatmap 402 comprises a first dimension 420 representing stocking locations at one or more supply chain entities 150, a second dimension 422 representing one or more items that are stocked at the stocking locations of the one or more supply chain entities 150, and third dimension 424 representing an occurrence risk of a supply chain event. According to embodiments, visualization system 110 displays one or more alert elements 410 at the intersection of first dimension 420 comprising a stocking location and second dimension 422 comprising item identity based on the stocking location and item of the supply chain event of the alert represented by each of the one or more alert elements 410. Visualization system 110 may represent third dimension 424 by displaying different types of one or more alert elements 410, wherein each type of the one or more alert element 410 is associated with a different value or ranges of values of the occurrence risk of the supply chain event associated with the alert represented by each of the one or more alert elements 410. For example, visualization system 110 may display one or more alert elements 410 with different colors, wherein each of the different color represents a value or range of values of the occurrence risk.

By way of example and not by way of limitation, when the colors of the one or more alert elements 410 is used to indicate the occurrence risk of the supply chain event alert represented by each of the one or more alert elements 410, visualization system 110 may display alert elements 410 representing alerts for supply chain events with a high occurrence risk a red color, alert elements 410 representing alerts for supply chain events with a low occurrence risk a green color, and alert elements 410 representing alerts with intermediate occurrences risks a range of orange and yellow colors. Additionally, visualization system 110 may display alert elements 410 using a black color or white color at intersections of first dimension 420 and second dimension 422 that do not represent actual combinations of stocking locations and items. Visualization system 110 may display alert elements 410 for which no prediction has been made using a black color, a white color, or other color. In addition or in the alternative, visualization system 110 may not display alert elements 410 at intersections of first dimension 420 and second dimension 422 that do not represent actual combinations of stocking locations and items or for which no prediction has been made. Although alert elements 410 are described as comprising particular colors to indicate certain values or ranges of values of occurrence risks, embodiments contemplate alert elements 410 comprising any suitable color to indicate particular values or ranges of values for one or more other metrics of the supply chain events represented by the alerts, including, for example, probabilities of occurrence, failure risk, or the like.

The exemplary manufacturer discussed above comprises predictions for order promising failures for each SKU-distribution center combination in the supply chain. In the illustrated embodiment comprising the exemplary manufacturer, first dimension 420 comprises an x-axis representing items, and second dimension 422 comprises a y-axis representing the distribution centers which stock each of the SKUs prior to shipment to fulfill customer orders. According to this example, for existing SKUs the color of the alerts of alert heatmap 402 indicates the system's prediction of a future service level failure, wherein red represents a high risk of failure, green represents a low or no risk of failure, the one or more yellow and orange colors transitioning from red to green represent intermediate risks of failure, and black represents item location combinations that are not predicted for the displayed week.

When alert elements 410 are grouped into a column or row and every alert element 410 in the column or row is associated with one of one or more supply chain entities 150, such as, for example, the manufacturing plant, a distribution center, or the like, heatmap 402 provides the visualization of global or wide-spread problems, which are indicated when all or nearly all alert elements 410 in a row or a column indicate that a supply chain event is likely to occur, such as, for example, by all of the alert elements 410 displayed with a red color. Continuing with the example of the exemplary manufacturer, each SKU is produced at only one of the one or more supply chain entities 150 and all alert elements 410 in a single column represent one item, when adjoining columns of alert elements 410 representing the same plant are displayed with a red color, visualization system 110 indicates the likely cause is a production problem that affects all of the items at a manufacturing facility. Additionally, in the illustrated embodiment of the exemplary manufacturer, all alert elements 410 in a single row represent distribution centers, which are grouped according to geographic region (e.g. Central Europe (EUC), Northern Europe (EUN), Western Europe (EUO), and Southern Europe (EUS)). When an entire row of alert elements 410 is displayed with a red color (or other graphic representing a high risk of occurrence for the supply chain event), visualization system 110 indicates the likely cause is likely a logistics problem that affects all of the items at the distribution center, and when adjoining rows of alert elements 410 grouped into the same geography region are displayed with a red color (or other graphic representing a high risk of occurrence for the supply chain event), visualization system 110 indicates the likely cause is likely a regional problem.

Figure 5A:
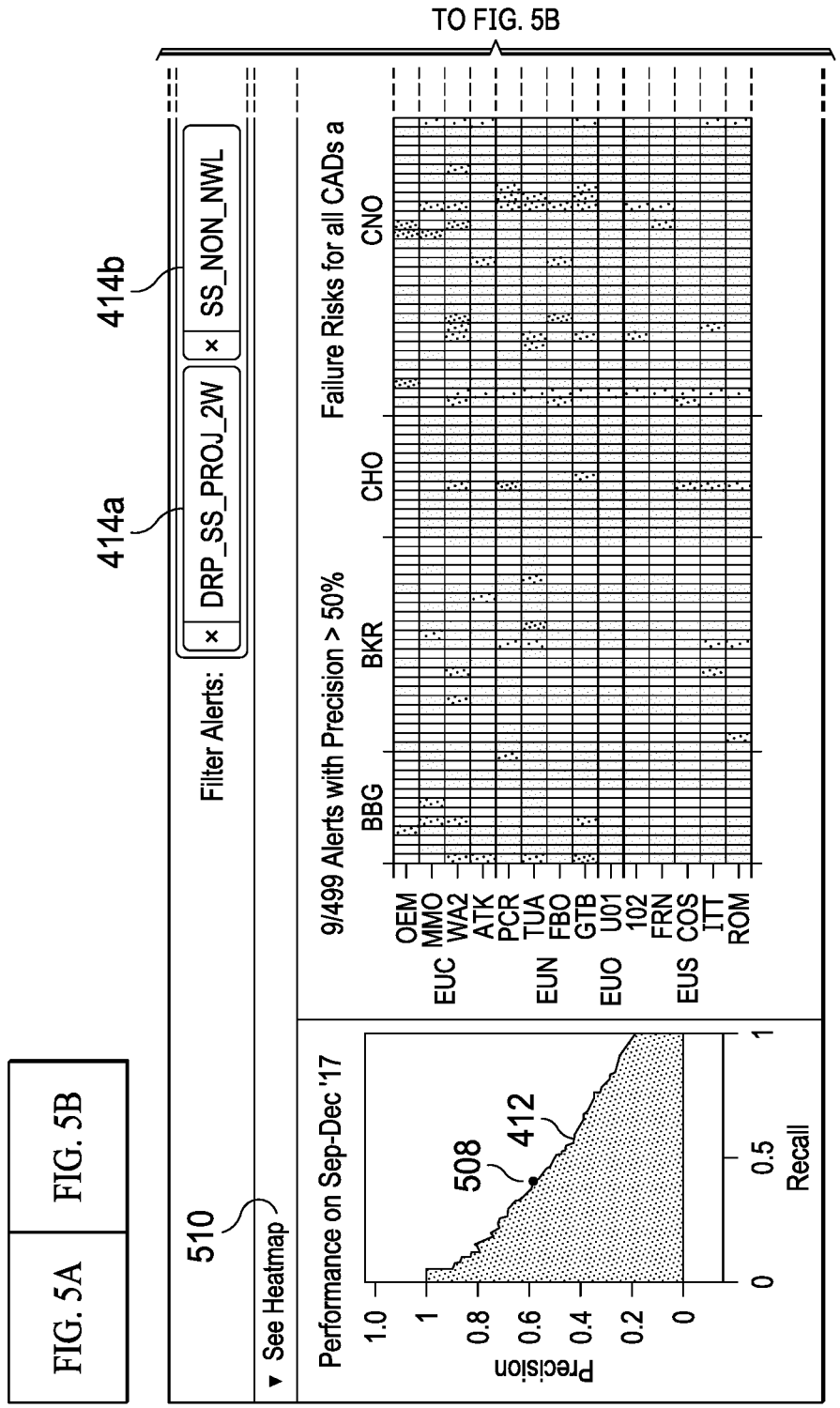
FIGS. 5A-B illustrate the interactivity one or more alert elements of FIGS. 4A-B in more detail, in accordance with an embodiment.
Figure 5B:
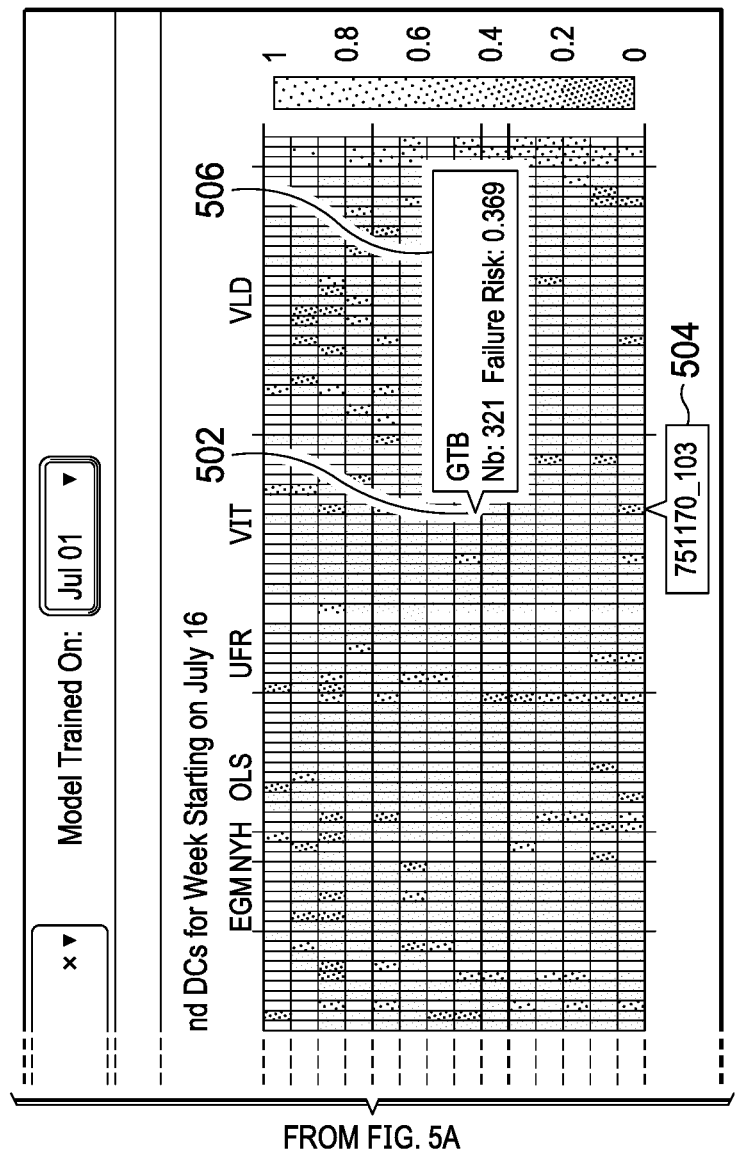

FIGS. 5A-B illustrate the interactivity of one or more alert elements 410 of FIGS. 4A-B in more detail, in accordance with an embodiment. According to some embodiments, one or more alert elements 410 comprise interactive display regions of a GUI that are selectable by, for example, clicking on or hovering over the display region comprising one or more alert elements 410 using a mouse, touchscreen, or other input device. Selected alert element 502 comprises one of the one or more alert elements 410 having an interactive display region and selected using the visualization UI of visualization module 200. When one or more alert elements 410 are selected, visualization module 200 displays one or more visualizations comprising information related to selected alert element 502 on the master visualization dashboard 300. According to some embodiments, visualization module 200 displays, in response to selection of one of the one or more alert elements 410, one or more visualization that, for example, highlight selected alert element 502 on alert heatmap 402, updates the visualizations of the master visualization dashboard 300 to display visualizations associated with the supply chain event of the alert represented by selected alert element 502, display item information popup 504, and/or display occurrence risk popup 506. Item information popup 504 comprises a graphical element displayed by visualization module 200 and identifying the item associated with the supply chain event for the alert represented by the selected element 502. Occurrence risk popup 506 comprises a graphical element displayed by visualization module 200 and identifying, for example, an occurrence risk of the supply chain event represented by the selected alert 502, an alert identification number, and the regional distribution center associated with the supply chain event for the alert represented by the selected alert 502.

For the illustrated exemplary manufacturer, alert elements 410 correspond to alerts representing predicted service level failures for various products being distributed from European distribution centers. Continuing with this example, when one of the one or more alert elements 410 is selected, visualization module 200 updates one or more visualizations of the master visualization dashboard 300 to display contextual information related to the predicated service level failure represented by the alert corresponding to selected alert element 502, such as, for example, inventory and orders for the item associated with the selected alert element 410.

In addition and as described above, visualization module 200 may display the performance of the prediction model in model performance visualization 404. According to embodiments, when one or more alert elements 410 are selected, visualization module 200 displays the performance of the model for selected alert 502 by displaying the corresponding precision and recall of selected alert 502 on performance curve 412 using indicator 508 and displaying numerical values for the precision and recall measurements with overlay 510. Precision and recall measurements indicate the performance of the prediction model and are used to calculate the occurrence probability for predicted supply chain events, the failure risk for predicated supply chain failures, and/or one or more other metrics, as described herein.

Supply chain event predictor 120 predicts the occurrence of supply chain events, such as, for example, an order promising failure, by training a prediction model using historical supply chain data. Over time, historical supply chain data may grow to include additional historical supply chain data from newer time periods. Supply chain event predictor 120 may use the newer historical supply chain data to train the prediction model, which may improve the performance of the prediction model and the quality of the predictions. After training, supply chain event predictor 120 may test the performance of the updated prediction model by generating predictions of supply chain events over a particular time period. Some of the predicted supply chain events will correspond to supply chain events that actually occur (i.e. the prediction is correct) while other predicted supply chain events will not occur (i.e. the prediction is wrong). Additionally, supply chain event predictor 120 will fail to predict some supply chain events that actually occur (i.e. the supply chain event is missed). Using these measurements of the number of correct predictions, total predictions, and total actual supply chain events, the performance of the supply chain model may be calculated using two measurements, precision and recall. Precision is a measurement of the number of correct positive predictions divided by the total number of positive predictions. For example, when supply chain event predictor 120 uses the model to predict service level failures in a supply chain network for a three-week period, precision is a measure of the number of predicted service level failures that actually occur in the supply chain network during the three-week period divided by the total number of predictions of failure. A precision of 80% would indicate that, for eight out of ten predictions, the predicted event (such as, a service level failure) will actually occur.

Recall is the measure of correct predictions divided by the total number of actual supply chain events. For example, when supply chain event predictor 120 uses the model to predict service level failures, recall is a measure of the number of predicted service level failures that actually occur divided by the total number of service level failures (i.e. both the predicted service level failures and the non-predicted service level failures) that actually occur in supply chain network 100 for the three week period. A recall of 80% indicates that eight out of ten supply events (such as, a service level failure) that occur will be predicted.

When the model has a high recall, the precision is generally lower and the visualization module 110 will display predictions for a larger number of the supply chain events that occur but will also display a large number of predictions that are not correct. On the other hand, when the model has a high precision, the recall is generally lower and the visualization module 110 will display a fewer number of predictions that are globally more correct, but it will fail to predict a large number of the total supply chain events. According to embodiments, each supply chain event prediction is associated with a precision and recall value, given the past performance of the model in similar context. Although only a single model is illustrated and described, embodiments contemplate more than one model, wherein various models may have different curves of precision and recall.

According to embodiments of the prediction model comprising a machine learning model, each time the machine learning model is trained, the precision and recall values of performance curve 412 are measured and the visualization module 200 updates performance curve 412 with the newly measured values. As discussed above, when one or more alert elements 410 are selected, visualization system 110 displays precision value and recall value on overlay 510 which indicates the past performance of the prediction model for selected alert 502, which indicates the confidence that the supply chain event predicted by selected alert 502 will occur or that a supply chain event will be missed.

Figure 6:
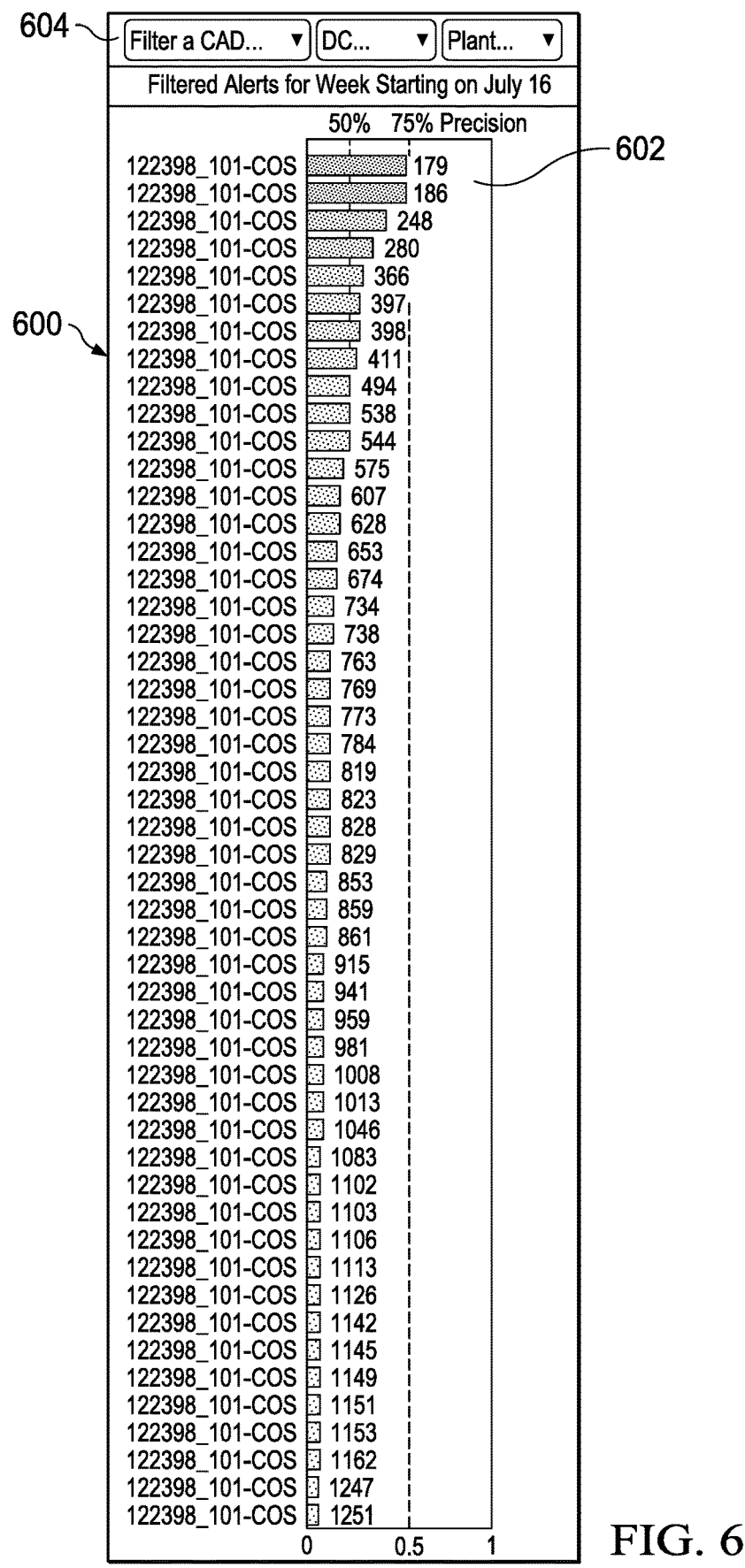
FIG. 6 illustrates the alert priority visualizer of FIGS. 3A-F in more detail, in accordance with an embodiment.

FIG. 6 illustrates the supply chain alert priority visualizer 600 of FIGS. 3A-F in more detail, in accordance with an embodiment. Supply chain alert priority visualizer 600 displays alerts for predicted supply chain events as bars 602 in a column, ordered according to prioritization or filter criteria, and colored, such as, for example, red, orange, yellow, and green) to indicate occurrence risk, value of sorting criteria, precision value, or the like. Filter selection box 604 comprises dropdown selection boxes providing for filtering bars 602 to display alerts according to item, stocking location, and manufacturing plan. Although particular filtering criteria are illustrated, embodiments contemplate other filtering criteria, according to particular needs. According to embodiments, when one or more prioritizations or filters are selected, visualization module 200 displays bars 602 in accordance with the criteria of the prioritization or filter. In an embodiment where alerts represent service level failures, bars 602 may be ordered according to the failure risk of the service level failure of the associated alert.

In addition, embodiments contemplate automatic hiding and filtering of alerts that, for example, will be accounted for in the planning process of the supply chain network 100, represent high manufacturing volumes of items, represent null safety stock, and the like. When the supply chain event predictor 120 uses a machine learning model, the system may generate alerts for situations that are already handled by the one or more planning systems and will be resolved elsewhere in the supply chain network 100. For example, when an item is discontinued or a distribution center is closed, visualization system 110 may display an alert that stock is lacking at one or more supply chain locations. However, according to some embodiments, visualization system 110 may be set to automatically filter and not display any alerts for discontinued items or closed distribution centers or other supply chain entities 150. Embodiments contemplate, filters for displaying alerts for strategic tires or strategic distribution centers with a higher importance or priority than alerts for non-strategic tires or non-strategic distributions centers. Similarly, one or more filters may cause alerts for products with high sales volumes or for priority customers be displayed prior to alerts for products with low sales volumes or for non-priority customers, even if the products with low sales volume products or for non-priority customers have a higher failure risk.

By way of a further example, a manufacturer may have a production capacity problem where total orders exceed supply, but all plants are running at maximum capacity. Visualization system 110 may automatically filter and not display the alert for the production capacity problem because the only resolution would be to build additional manufacturing capacity, which is not an actionable event because building additional manufacturing plants may take several years. In other words, visualization system 110 may automatically not display alerts using one or more exclusion rules (which may be user-supplied exclusion rules) for predicted events where the only resolution is not actionable within a practical horizon.

Another type of alert filtering comprises deprioritizing or not displaying alerts that are handled by other supply chain planning systems. In one embodiment, visualization system 110 does not display an alert for a service level failure caused by a production planning problem when the production planner will account for the service level failure in the production forecast. In addition, according to some embodiments, when a production planning system will identify when predicted stock is not projected to meet the safety stock, visualization system 110 may filter and not display an alert for a corresponding predicated supply chain event.

Figure 7:
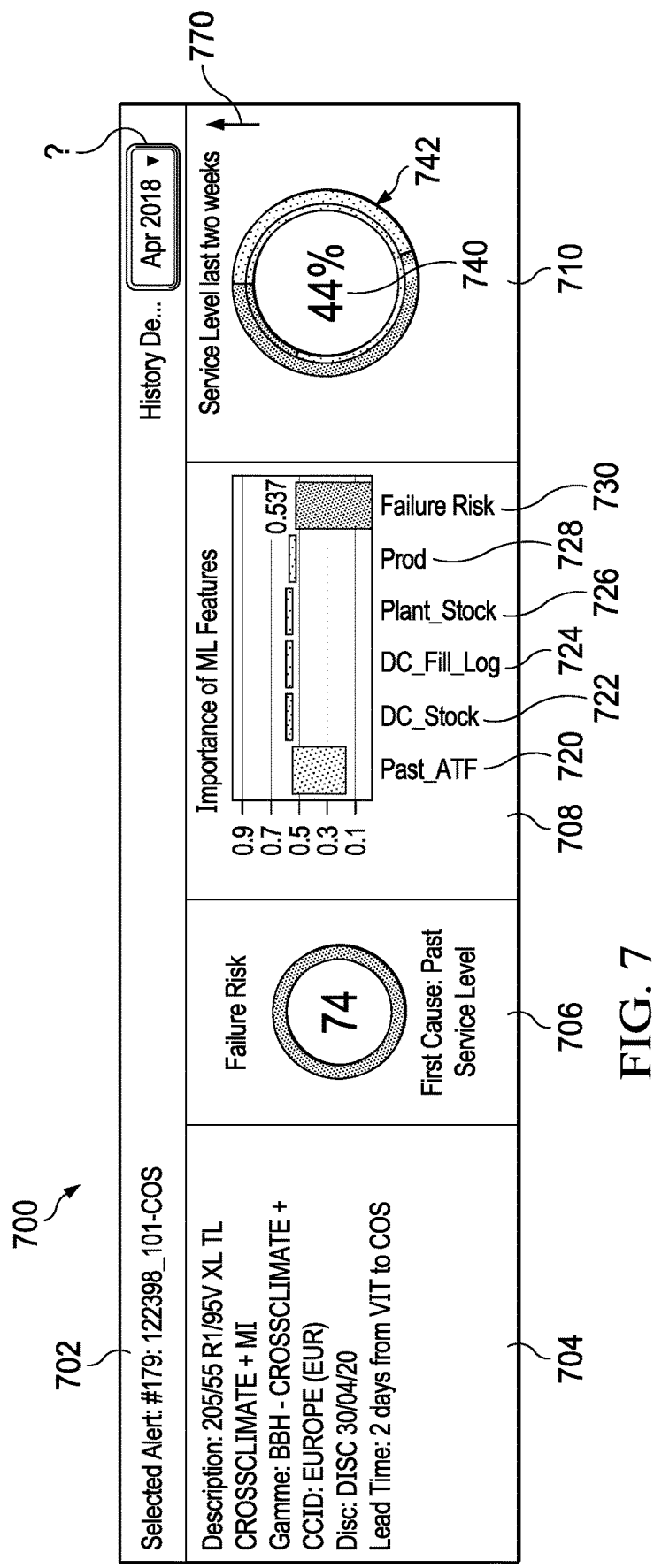
FIG. 7 illustrates the selected alert overview of FIGS. 3A-F in more detail, in accordance with an embodiment.

FIG. 7 illustrates the alert visualization of FIGS. 3A-F in more detail, in accordance with an embodiment. According to embodiments, alert visualization 700 comprises alert identification 702, alert summary 704, occurrence risk scoreboard 706, features contributions visualization 708, and contextual data scoreboard 710. Alert identification 702 comprises an identifying code or text that identifies one or more supply chain components associated with the alert, such as, for example, the name of the item, a SKU, a stocking location, a manufacturer, a distribution region, or any other supply chain component, including the identity of one or more supply chain entities associated with the alert. For example, the illustrated selected alert identification 702 comprises an alert identifier represented by a three-digit number, a SKU represented by a six-digit number and a three-digit number connected by an underscore mark, and a distribution center identifier comprising a three digit alphabetic code.

According to embodiments, alert summary 704 comprises a description of the item, the region where the item is distributed, the seasonality of the item, the lead time between the item's stocking location and the item's the manufacturing plant, and the like. Although alert summary 704 is described as comprising particular description of an item, embodiments contemplate alert summary 704 comprising any suitable descriptive elements, including, for example, pictures, sales and production volume, and the like, according to particular needs.

According to embodiments, occurrence risk scoreboard 706 comprises a metric for assessing the probability that the predicted supply chain event will actually occur, such as, for example, an occurrence risk, failure risk, or the like. According embodiments, occurrence risk scoreboard 706 comprises a failure risk score, which indicates a score of the probability that a predicted service level failure will result in an actual service level failure. As described in more detail below, visualization system 110 displays a score of the occurrence risk, which is calculated by visualization system 110 and/or supply chain event predictor 120 based on one or more factors identified during training of the prediction model and which are determined to have predictive power with regard to the occurrence of a particular supply chain event using, for example, precision/recall or receiver operating characteristics. For example, occurrence risk scoreboard 706 comprises an occurrence risk score of 74% and indicates which predictive factor contributed the largest amount to the occurrence risk score, such as, for example, "Past Service Level." This indicates that supply chain event predictor 120 calculated a score of the probability that a service level failure will occur for this predicted supply chain event with 74% probability based on one or more predictive factors identified during training of the prediction model, of which "Past Service Level" was the predictive factor with the highest contribution to the score.

According to embodiments, features contributions visualization 708 comprises a visualization of the contribution from one or more predictive factors 720-728 to the overall precision score of the snapshot. According to embodiments comprising an exemplary machine learning prediction model, supply chain event predictor 120 identifies from historical supply chain data, prediction features 720-738, which are data or data features associated with an increased or decreased probability of occurrence of a supply chain failure, such as, for example, a service level failure. According to embodiments, prediction features may comprise past service level feature 720, stock feature 722, fill rate feature 724, plant stock/safety stock feature 726, and production gaps feature 728. Although particular features are illustrated and described, embodiments contemplate any one or more predictive factors, according to particular needs.

When supply chain event predictor 120 uses the trained machine learning model to assess samples of supply chain data to identify predicted supply chain failures, supply chain event predictor 120 generates a model prediction 730 comprising a value between 0 and 1, where the closer the value is to 1, the more likely a failure will occur. To derive a probability of failure or failure risk score, prediction system 222 analyzes the past performance of model prediction 730. For example, during a training phase of machine learning, prediction system 222 may analyze a probability of failure for a particular model prediction. Assuming, for example, model prediction 730 is 0.8, and 50% of the sample having a model prediction greater than 0.8 correctly predicted failures, the probability of failure, also called precision may be measured as 50% when operating at a model prediction of 0.8. The calculated probability of a failure occurring is a failure risk score, as described above. In addition, visualization system 110 may generate and display a visualization of the contribution of each prediction feature to the probability that an alert will result in a service level failure, which may be used to identify which supply chain systems need to be adjusted to avoid the service level failure.

Contextual data scoreboard 710 comprises a visualizations comprising one or more visual elements that represent historical supply chain data and/or contextual data to illustrate important measurements, KPIs, or characteristics of one or more supply chain planning and execution systems 140 and/or one or more supply chain entities 150 that guide the selection of one or more corrective actions to resolve a supply chain event of the alert represented by selected alert element 502. According to embodiments, contextual data scoreboard 710 comprises historical item service level score, which represents the service level for one or more historical time periods of a SKU associated with the supply chain event of the alert represented by selected alert element 502. According to one embodiment, visualization system 110 and/or supply chain event predictor 120 calculates the historic SKU service level for one or more previous time periods and displays the result using a numerical score 740 and annular visualization 742. In the illustrated example comprising an exemplary manufacturer, numerical score 740 indicates that the historic service level is 44%, which indicates 44% of orders by volume of product were successfully filled on time, while nearly 56% were not successfully filled on time. In this manner, the performance of the item across all locations can be quickly compared with its performance at the location associated with the SKU of the service level failure of the selected alert. When an item is performing much better at the location of the selected alert than the global performance at all locations, then the problem causing the alert is likely not caused by the current location. On the other hand, when the item's performance at the alert location is worse than the global item performance, then the underlying causes of the alert is more likely associated with the alert location.

Furthermore, in some embodiments, contextual data scoreboard 710 comprises an arrow 770 representing the trend of the service level over the course of the last few weeks. For example, the arrow of the exemplary alert visualization is pointing up in the illustrated embodiments, which indicates the service level of the item has been improving in the last two weeks.

Figure 8:
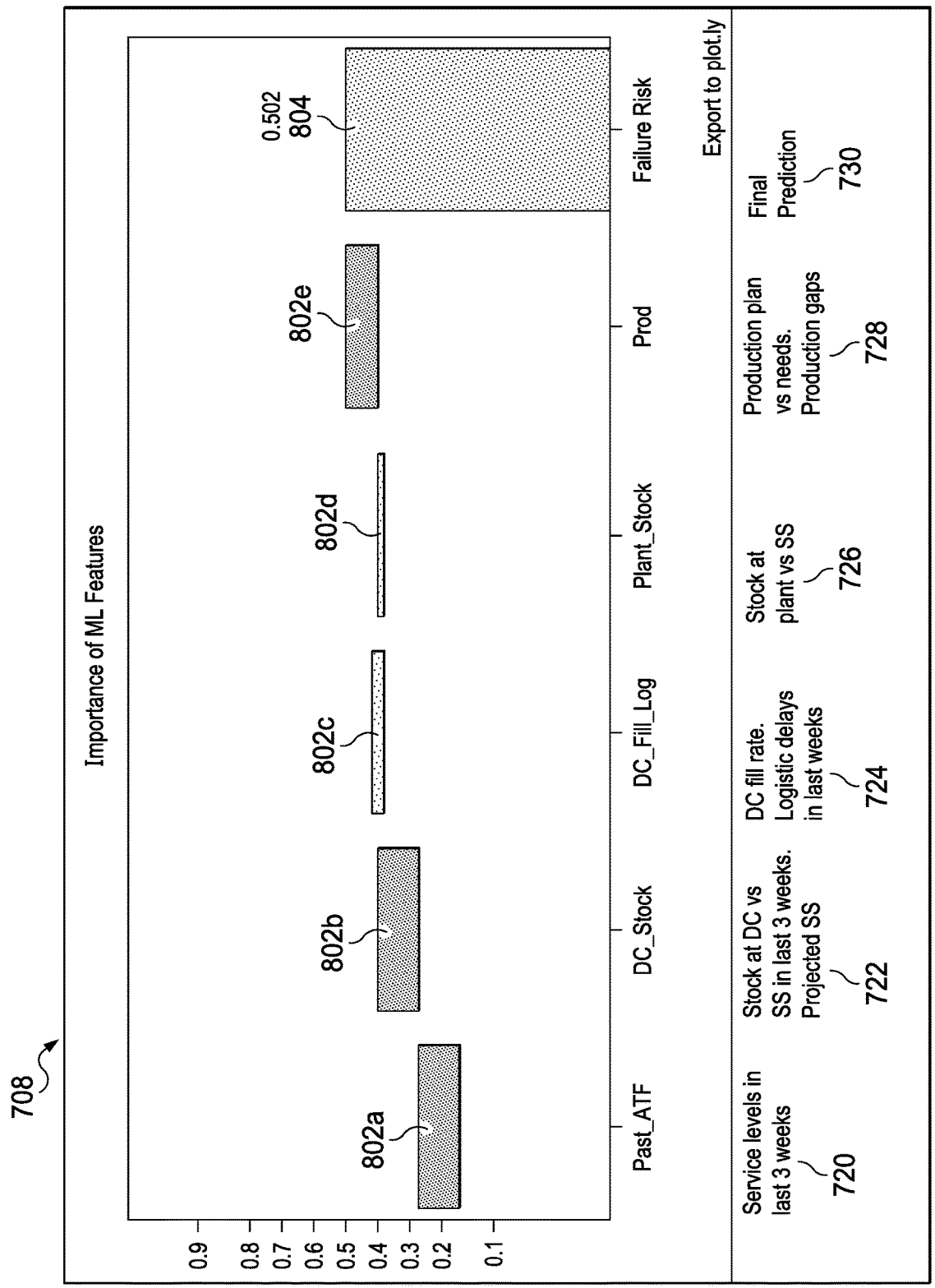
FIG. 8 illustrates the alert features contributions visualization of FIG. 7, in more detail according to embodiment.

FIG. 8 illustrates features contributions visualization 708 of FIG. 7 in more detail, in accordance with an embodiment. As described above, features contributions visualization 708 displays the contribution from one or more prediction features 720-728 to the overall precision score of the snapshot. One or more prediction features 720-728 comprise measured values from archived supply chain data and/or one or more machine learning features derived from archived supply chain data. According to an embodiment, features contributions visualization 708 comprises a waterfall chart where each of the first five bars represents the contribution of a prediction feature to the calculated value of the precision value, which is represented by the sixth bar and is correlated to occurrence risk score 710. As described in more detail below, features contributions visualization 708, according to a waterfall chart embodiment, identifies the magnitude and direction of the effect of each of the one or more prediction features 720-728 by the color and size of the bars 802a-802e. Bars 802c-802d having a first color (e.g. green) may represent a positive impact to the precision level while bars of a second color 802a-802b and 802e (e.g. red) may represent a negative impact to the precision level. As discussed above, final bar 804 of the waterfall chart may represent a precision level and comprise the cumulative sum of the contributions of each of prediction features 720-728. By visualizing prediction features 720-728 in this manner, visualization system 110 displays the context of an alert and the factors that contribute to the failure risk, which suggests the one or more corrective actions to prevent the supply chain event. However, as discussed below, one or more features 720-728 and the contribution of the one or more prediction features 720-728 to an overall score representing the probability that a failure will occur may be visualized in various different configurations.

In the illustrated example, final bar 804 of features contributions visualization 708 indicates the model prediction is 0.502. Based on the precision and recall measurements calculated for the prediction model, an overall prediction of 0.502 was determined to correspond to a probability of occurrence of 74%, which may be referred to as an occurrence risk. For a service level failure, the occurrence risk may be referred to as a failure risk. Each of the bars 802a-802e illustrates the contributions from one or more features 720-728 to the probability the supply chain event will occur. For example, the various contributing factors to the overall prediction may comprise the service level over a preceding time period (here, three weeks), the stock at the distribution center compared with safety stock levels over a preceding time period (here, again a three week period was selected), the distribution center fill rate, the stock of the SKU at the manufacturing plant versus the safety stock, and the amount of product in the production plan versus the needs (i.e. production gaps).

To further explain, an example is now given in relation to the exemplary manufacturer. Continuing with this example, first bar 802a represents service level feature 720 comprising the service levels in the last three weeks. In this case, the particular product may not be supplied to the particular distribution center because the product failed to be supplied correctly from a distribution center for the last three weeks. This may then be a factor that this product will not be supplied on time during the displayed time period. Second bar 802b represents stock feature 722 comprising how much stock is at the distribution center compared with the safety stock for the last three weeks. Whether the projected safety stock is going up or down can give some insight into the stock at the distribution center stock over the next few weeks. Third bar 802c represents fill rate feature 724 comprising the fill rate of the distribution center. In other words, for all of the different products combined, when the distribution center is filled with near 100% of capacity, there may be some logistic delay which would be a factor that would increase the overall service level failure risk. For example, when trucks have been late for three weeks in a row, it may impact the future service level. Fourth bar 802d represents plant stock/safety stock feature comprising how much stock is at the manufacturing plant compared with the safety stock for the last three weeks. Fifth bar 802e represents production gaps feature 728 comprising the production plan compared with the predicted demand. In other words, what is the difference between what is being planned to be produced and what are the actual needs of the supply chain. Finally, and as described above, bars 802a-802e represent each of prediction features 720-728 that feed into the overall occurrence risk score which is calculated based on precision value 730 represented by final bar 804. Although particular factors are illustrated, embodiments contemplate other combinations of one or more features 720-728 used to predict the occurrence of a supply chain failure, according to particular needs.

Figure 9:
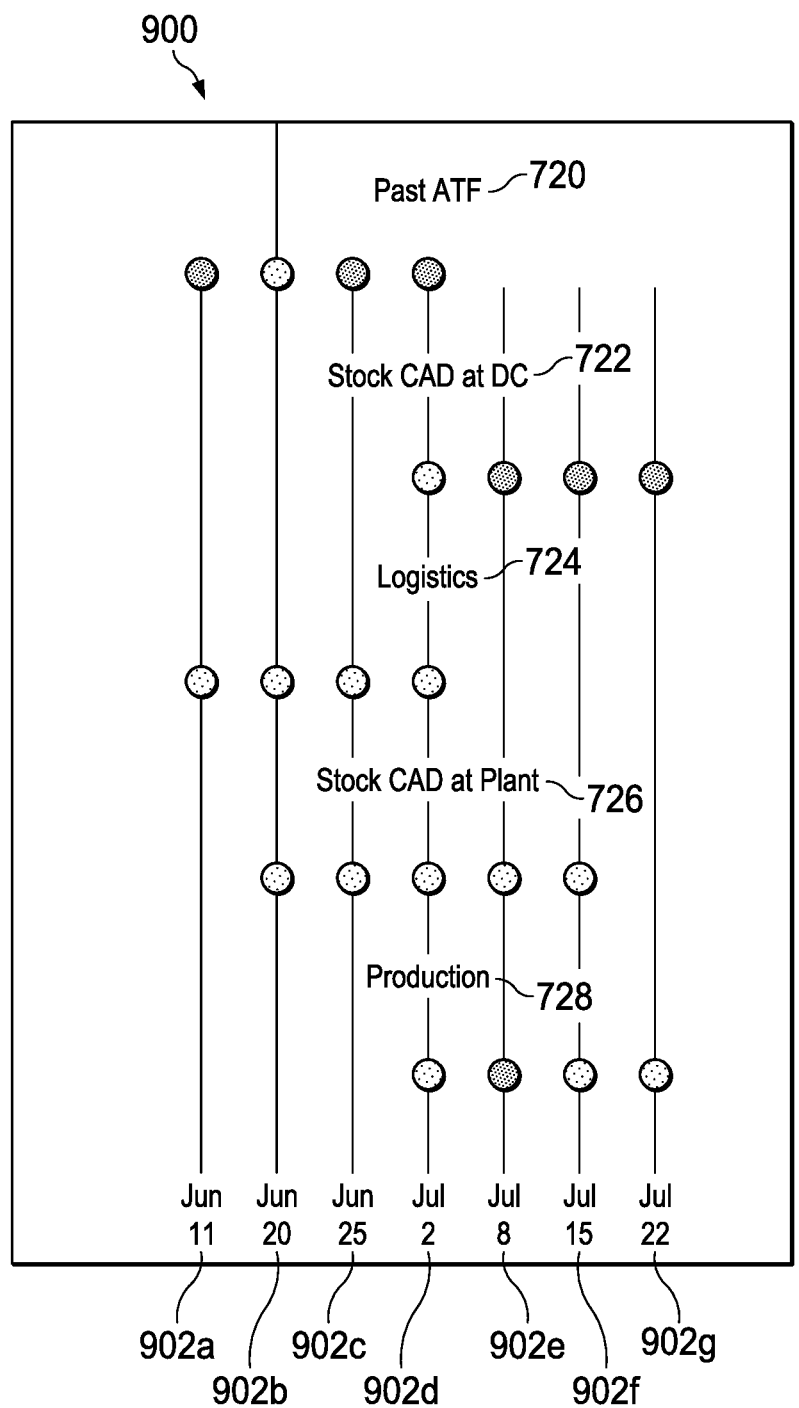
FIG. 9 illustrates a temporal alert features contributions visualization, according to an embodiment.

FIG. 9 illustrates temporal prediction contributions visualization 900 in more detail, in accordance with an embodiment. According to embodiments, temporal prediction contributions visualization 900 displays the direction of the contribution from each of five features 720-728 to the overall failure risk for one or more time periods. For example, temporal prediction contributions visualization 900 comprises three historical time periods 902a-902c (to the left of the vertical line), a current time period 902d indicated by a vertical line, and three future time periods 902e-902g (to the right of the vertical line.) Circular icons 904 are located in five rows at each of the seven time periods 902a-902g, where each row indicates one of five features 720-728 used to calculate an occurrence risk score and the color of the circular icon indicates whether one or more features 720-728 gives a positive, negative, or neutral contribution to the alert risk score for the time period 902a-902g and one or more features 720-728 associated with its location. For example, temporal prediction contributions visualization 900 indicates a positive contribution using a green circle, a negative contribution using a red circle, and a neutral contribution using a black circle. Using this scheme, the temporal prediction contributions visualization 900 identifies that fill rate feature 724 and plant stock/safety stock feature 726 both contributed positively in historical time periods 902a-902c, while past service level feature 720 has increased the risk of supply chain failure in the current time period 902d, and stock feature 722 is predicted to increase the risk of a supply chain failure in all three future prediction time periods 902e-902g.

Figure 10:
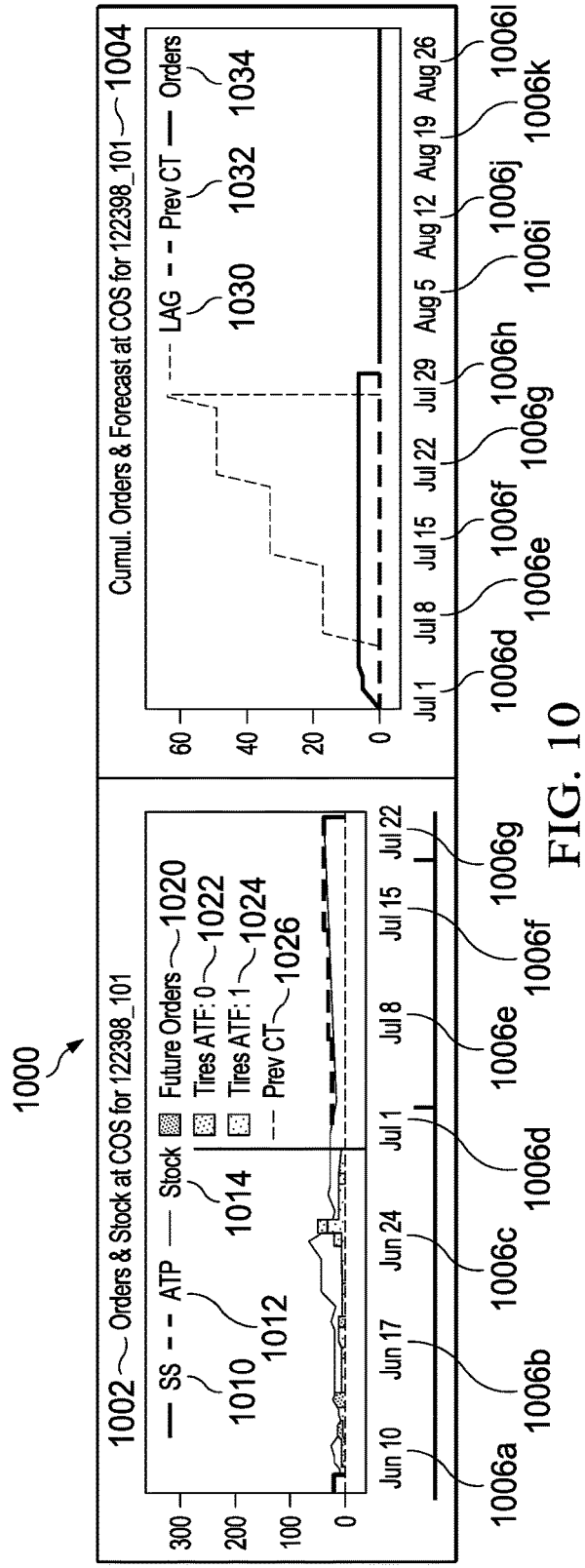
FIG. 10 illustrates the location overview visualization of FIGS. 3A-F in more detail, in accordance with an embodiment.

FIG. 10 illustrates the location overview visualization 1000 of FIGS. 3A-F in more detail, in accordance with an embodiment. According to embodiments, location overview visualization 1000 comprises summaries for one or more items and locations associated with the selected alert for three historical time periods 1002a-1002c (to the left of the vertical line), a current time period 1002d indicated by a vertical line, and three future time periods 1002e-1002g (to the right of the vertical line.) According to embodiments, an orders and stock visualization 1004 of location overview visualization 1000 displays summaries of safety stock levels 1010, available-to-promise (ATP) levels 1012, stock levels 1014, future orders 1020, orders where service level was not met (Tires Service Level: 0) 1022, and orders where services level was met (Tires Service Level: 1). Additionally, cumulative orders and forecasting visualization 1006 of location overview visualizations 1000 may comprise confirmed orders 1030, summaries of cumulative forecasting gaps with confirmed orders including, for example, a comparison of a previous month's forecast with previous forecast (LAG 1) 1032, and comparisons of forecasts with orders (Prey CT) 1034 such as, for example, illustration of under-forecasting and over-forecasting, for a current period 1002d and eight future time periods 1002e-1002l.

According to embodiments, location overview visualization 1000 displays the cumulative production forecast for the last monthly forecast created by the planning and execution systems for a particular SKU. Cumulative orders and forecasting visualization 1006 comprises a cumulative order that has been made so far. A vertical line at the current period 1002d indicates the demarcation between historically sourced metrics and predicted. Cumulative orders and forecasting visualization 1006 illustrates that approximately forty items would sell at a future time period 1002f and that the last forecast predicted an even higher number of sales in anticipation of the increased sales. Even with the increased forecast, cumulative orders and forecasting visualization 1006 indicates that even with the increased forecast, the system still under-forecasted sales, and the order was not fully filled. The under-forecast for the order caused the alert as indicated by the contextual data of the product overview visualization 1100. Based on the contextual supply chain data, the corrections to resolve the supply chain event that caused the alert may include, for example, manually increasing the item stock or manually increasing the forecasts.

Figure 11:
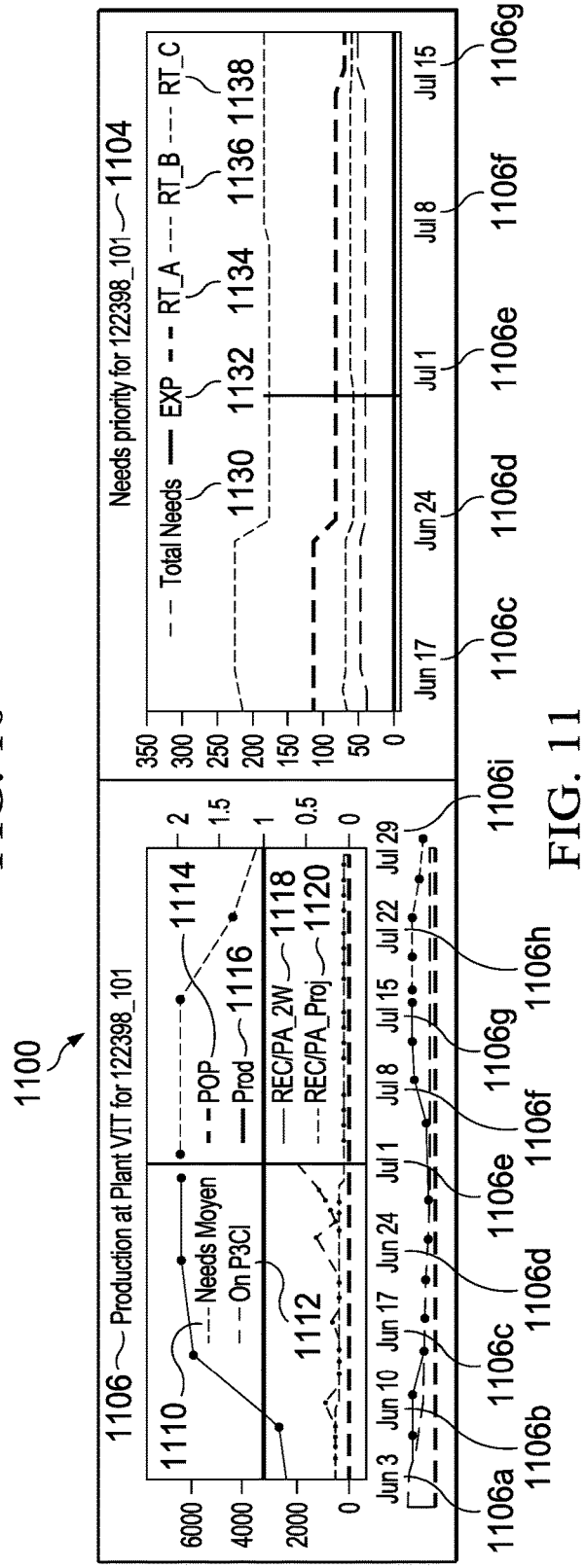
FIG. 11 illustrates the production overview visualization of FIGS. 3A-F in more detail, in accordance with an embodiment.

FIG. 11 illustrates the production overview visualization 1100 of FIGS. 3A-F in more detail, in accordance with an embodiment. According to embodiments, production overview visualization 1100 comprises summaries of production for one or more products at a manufacturing plant for four historical time periods 1102a-1102d (to the left of the vertical line), a current time period 1102e indicated by the vertical line, and four future time periods 1102f-1102i (to the right of the vertical line.) According to embodiments, the production overview visualizations 1100 illustrate summaries of production for one or more products, such as, for example, the current product stock at a particular manufacturing plant, using production plant visualization 1104. Production plant visualization 1104 comprises current stock at plant 1112, current production needs 1110, planned production 1114, actual production 1116, and metrics comparing production with needs 1118-1120. Needs priority visualization 1106 illustrates the total needs for an item 1130, and whether the items are needed for export 1132 or particular markets (RT_A, RT_B, and RT_C) or other destinations. Production overview visualizations 1100 display contextual data for production problems associated with a selected alert, such as when one or more items are stuck at a manufacturing plant, what portion of a production plan was executed, and what percentage of total products in the plan were actually produced.

Figure 12A:
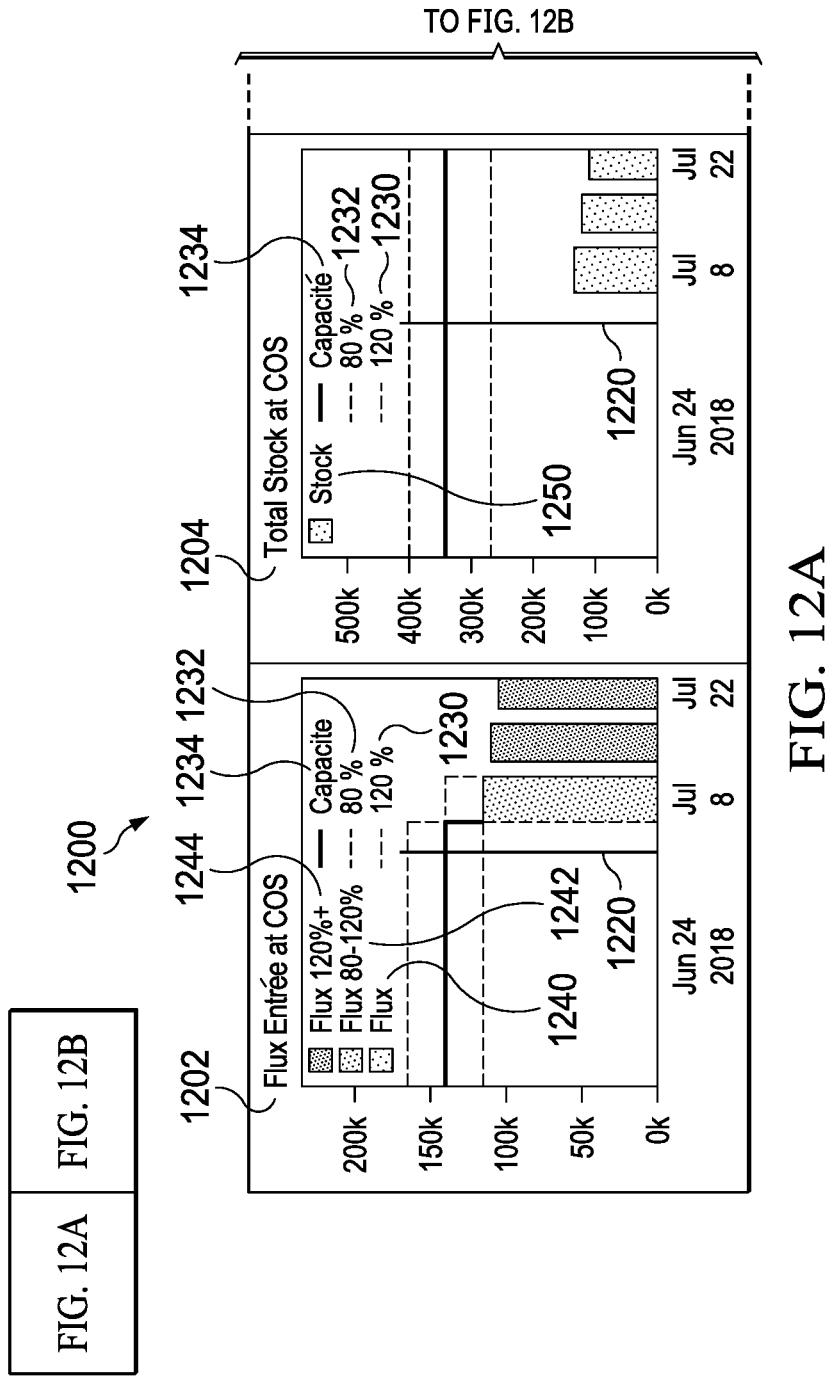
FIGS. 12A-B illustrate the logistics overview visualization of FIGS. 3A-F in more detail, in accordance with an embodiment.
Figure 12B:
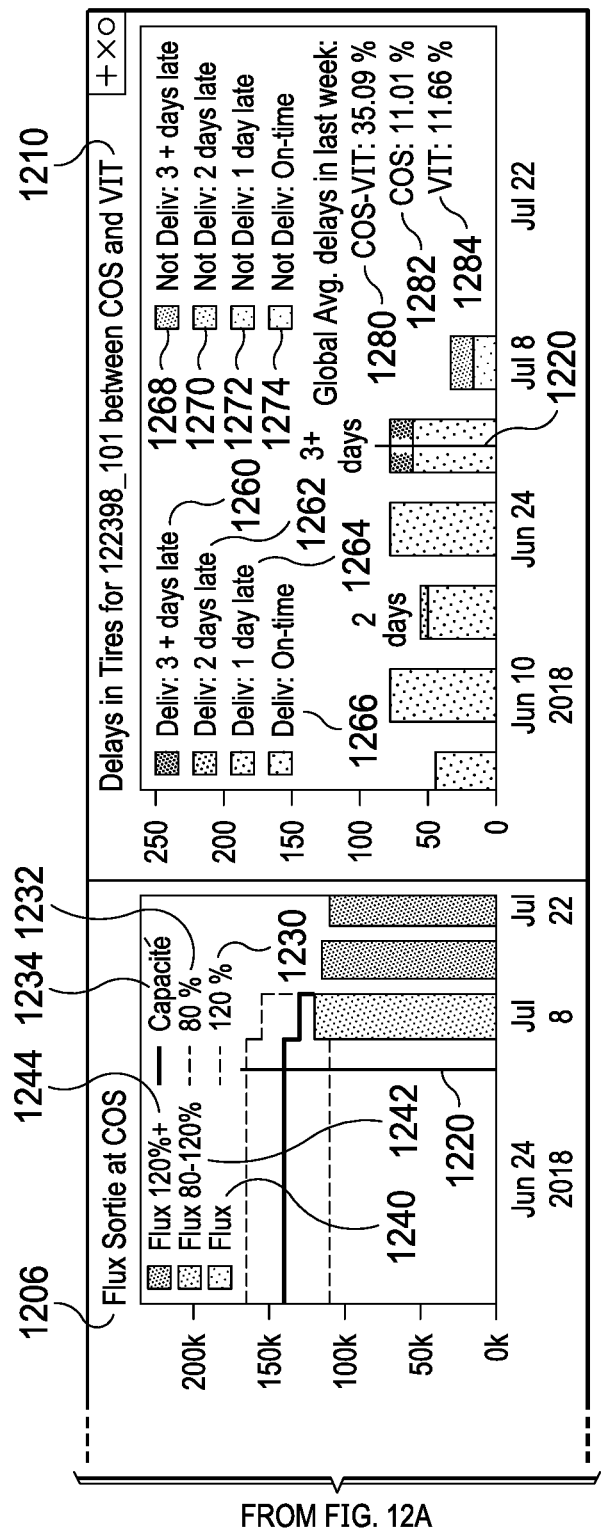

FIGS. 12A-B illustrate logistics overview visualization 1200 of FIGS. 3A-F in more detail, in accordance with an embodiment. According to embodiments, logistic overview visualizations 1200 comprise, for example, stock movement visualizations 1202-1206, such as total volume entering a location every week 1202, and total volume in the location every week 1204, total volume leaving the location every week 1206) and logistic delays visualization 1210 illustrating transportation delays for a product between a source and a location. Stock movement visualizations 1202-1206 illustrate for a current time period 1220, one or more past time periods, and one or more future time periods, capacity 1230, 80% capacity 1232, and 120% capacity 1234 of the distribution center COS. Total volume entering a location every week visualization 1202 and total volume leaving the location every week visualization 1206 may additionally display movement of total volume of goods (flux) 1240, 80-120% of flux 1242, and greater than 120% of flux (120%+) 1244. Total volume in the location every week visualization 1204 may additionally display total volume of stock 1250. Logistic delays visualization 1210 displays delays in tire shipments for volumes of tires delivered and not delivered between a manufacturing plant U01 and a distribution center VIT including, for example, Delivery 3+ days late 1260, Delivery 2 days late 1262, Delivery 1 day late 1264, Delivery on time 1266, Not delivered 3 days late 1268, Not delivered 2 days late 1270, Not delivered 1 day late 1272, Not delivered on-time 1274, and average delay in the last week between the manufacturing plant and the distribution center 1280, average for the manufacturing plant and all distribution centers 1282, and average for the distribution center and all manufacturing plants 1284.

Continuing with the example of the exemplary manufacturer, the logistics problem visualizations 1200 show capacity for what is entering at the distribution center, what is leaving the distribution center, the global stock, and the like. This may illustrate how much latitude a supply chain planner may have to implement a correction to a predicted supply chain failure by visualizing the amount of available storage for an item at a particular distribution center. For example, when a distribution center is full, a correction that adds more stock to the distribution center may not resolve the supply chain failure and, instead, may cause one or more additional failures because the distribution center cannot handle any more stock. In addition, the visualization may illustrate the average delays in product over the last few weeks, which shows if there have been logistic problems recently and if future orders will be made on time.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A user interface for a low-touch centralized system to predict service failures in a supply chain using machine learning, comprising:
a server comprising a processor and a memory, the server configured to:
receive only historical supply chain data from an archiving system, the archiving system storing historical supply chain data from a supply chain network comprising one or more supply chain entities, wherein the one or more supply chain entities store one or more items at one or more stocking locations;

predict one or more supply chain events during a prediction period by applying a prediction model to a sample of historical supply chain data comprising a sample period earlier than the prediction period, each of the one or more supply chain events associated with at least one item of the one or more items and at least one stocking location of the one or more stocking locations during a prediction period;

calculate an occurrence risk score for at least one of the one or more supply chain events, the occurrence risk score indicating a possibility that the at least one of the one or more supply chain events will occur;

calculate precision and recall scores for the prediction model, wherein the precision scores indicate a proportion of predicted supply chain events that actually occur, and wherein the recall scores indicate a proportion of supply chain events that occur will be predicted;

generate one or more alerts for the one or more supply chain events, each of the one or more alerts associated with at least one alert supply chain event of the one or more supply chain events, the one or more alerts comprising at least one alert item and at least one alert stocking location, the at least one alert item identifying the at least one item of the at least one alert supply chain event and the at least one alert stocking location identifying the at least one stocking location of the at least one alert supply chain event;

render, for display on a user interface, an alert heatmap visualization comprising one or more selectable user interface elements represented by one or more alert elements, each of the one or more alert elements associated with an alert, located on the alert heatmap at a position along a first dimension representing the at least one alert item of the associated alert, located on the alert heatmap at a position along a second dimension representing the at least one alert stocking location of the associated alert, and displayed in a color representing the occurrence risk score of the associated alert; and provide one or more tools for initiating one or more corrective actions to be undertaken in order to resolve one or more underlying causes of the at least one alert supply chain event.

2. The user interface of claim 1, wherein the server is further configured to:
identify one or more factors relied on by the prediction model to generate the occurrence risk score, the one or more factors associated with one or more supply chain features; and
generate a visualization representing a magnitude and a direction of a contribution by each of the one or more features to the occurrence risk score.

3. The user interface of claim 2, wherein the server is further configured to:
detect selection of at least one of the one or more selectable user interface elements represented by the one or more alert elements;
identify a selected alert associated with the one or more alert elements that represent the at least one of the one or more selectable user interface elements; and
display a precision value of the selected alert for the supply chain event, the precision value indicating a probability the supply chain event will occur based on the past performance of the prediction model for predicting the supply chain event.

4. The user interface of claim 3, wherein the prediction model comprises a gradient boosted trees machine learning model, and the prediction period is less than a planning horizon and at least as long as a minimum amount of time for completing one or more corrective actions.

5. The user interface of claim 4, wherein the supply chain event is a service level failure, and the occurrence risk score is a failure risk score.

6. The user interface of claim 5, wherein the server is further configured to:
identify one or more properties of the one or more alerts;
receive a filter comprising one or more criteria;
detect each of the one or more alerts having one or properties corresponding to the one or more criteria of the filter; and
filter each of the one or more alerts detected as having one or more properties corresponding to the one or more criteria of the filter by rendering a filtered alert element for each of the filtered one or more alerts, the filtered alert element located on the alert heatmap at a position along a first dimension representing the at least one alert item of the associated alert, located on the alert heatmap at a position along a second dimension representing the at least one alert stocking location of the associated alert, and displayed in a color different than the color representing the occurrence risk score of the associated alert.

7. The user interface of claim 6, wherein the properties of the one or more alerts comprises the one or more underlying causes of the at least one alert supply chain event, the one or more underlying causes comprises a production planning problem, and the one or more corrective actions to be taken in order to resolve the one or more underlying causes comprises a time period longer than a production planning horizon.

8. A method to predict service failures in a supply chain using machine learning, comprising:
receiving, by a server comprising a processor and a memory, only historical supply chain data from a supply chain network comprising one or more supply chain entities, wherein the one or more supply chain entities store one or more items at one or more stocking locations;
predicting, by the server, one or more supply chain events during a prediction period by applying a prediction model to a sample of historical supply chain data comprising a sample period earlier than the prediction period, each of the one or more supply chain events associated with at least one item of the one or more items and at least one stocking location of the one or more stocking locations during a prediction period;
calculating, by the server, an occurrence risk score for at least one of the one or more supply chain events, the occurrence risk score indicating a possibility that the at least one of the one or more supply chain events will occur;
calculating, by the server, precision and recall scores for the prediction model, wherein the precision scores indicate a proportion of predicted supply chain events that actually occur, and wherein the recall scores indicate a proportion of supply chain events that occur will be predicted;

generating, by the server, one or more alerts for the one or more supply chain events, each of the one or more alerts associated with at least one alert supply chain event of the one or more supply chain events, the one or more alerts comprising at least one alert item and at least one alert stocking location, the at least one alert item identifying the at least one item of the at least one alert supply chain event and the at least one alert stocking location identifying the at least one stocking location of the at least one alert supply chain event;

rendering, by the server, for display on a user interface, an alert heatmap visualization comprising one or more selectable user interface elements represented by one or more alert elements, each of the one or more alert elements associated with an alert, located on the alert heatmap at a position along a first dimension representing the at least one alert item of the associated alert, located on the alert heatmap at a position along a second dimension representing the at least one alert stocking location of the associated alert, and displayed in a color representing the occurrence risk score of the associated alert; and providing, by the server, one or more tools for initiating one or more corrective actions to be undertaken in order to resolve one or more underlying causes of the at least one alert supply chain event.

9. The method of claim 8, further comprising:

identifying, by the server, one or more factors relied on by the prediction model to generate the occurrence risk score, the one or more factors associated with one or more supply chain features; and generating, by the server, a visualization representing a magnitude and a direction of a contribution by each of the one or more features to the occurrence risk score.

10. The method of claim 9, further comprising:

detecting, by the server, selection of at least one of the one or more selectable user interface elements represented by the one or more alert elements;

identifying, by the server, a selected alert associated with the one or more alert elements that represent the at least one of the one or more selectable user interface elements; and displaying, by the server, a precision value of the selected alert for the supply chain event, the precision value indicating a probability the supply chain event will occur based on the past performance of the prediction model for predicting the supply chain event.

11. The method of claim 10, wherein the prediction model comprises a gradient boosted trees machine learning model, and the prediction period is less than a planning horizon and at least as long as a minimum amount of time for completing one or more corrective actions.

12. The method of claim 11, wherein the supply chain event is a service level failure, and the occurrence risk score is a failure risk score.

13. The method of claim 12, further comprising:

identifying, by the server, one or more properties of the one or more alerts;

receiving, by the server, a filter comprising one or more criteria;

detecting, by the server, each of the one or more alerts having one or properties corresponding to the one or more criteria of the filter; and filtering, by the server, each of the one or more alerts detected as having one or more properties corresponding to the one or more criteria of the filter by rendering a filtered alert element for each of the filtered one or more alerts, the filtered alert element located on the alert heatmap at a position along a first dimension representing the at least one alert item of the associated alert, located on the alert heatmap at a position along a second dimension representing the at least one alert stocking location of the associated alert, and displayed in a color different than the color representing the occurrence risk score of the associated alert.

14. The method of claim 13, wherein the properties of the one or more alerts comprises the one or more underlying causes of the at least one alert supply chain event, the one or more underlying causes comprises a production planning problem, and the one or more corrective actions to be taken in order to resolve the one or more underlying causes comprises a time period longer than a production planning horizon.

15. A non-transitory computer-readable medium embodied with software for user interface for a low-touch centralized system to predict service failures in a supply chain using machine learning, the software when executed configured to:

receive only historical supply chain data from an archiving system, the archiving system storing historical supply chain data from a supply chain network comprising one or more supply chain entities, wherein the one or more supply chain entities store one or more items at one or more stocking locations;

predict one or more supply chain events during a prediction period by applying a prediction model to a sample of historical supply chain data comprising a sample period earlier than the prediction period, each of the one or more supply chain events associated with at least one item of the one or more items and at least one stocking location of the one or more stocking locations during a prediction period;

calculate an occurrence risk score for at least one of the one or more supply chain events, the occurrence risk score indicating a possibility that the at least one of the one or more supply chain events will occur;

calculate precision and recall scores for the prediction model, wherein the precision scores indicate a proportion of predicted supply chain events that actually occur, and wherein the recall scores indicate a proportion of supply chain events that occur will be predicted;

generate one or more alerts for the one or more supply chain events, each of the one or more alerts associated with at least one alert supply chain event of the one or more supply chain events, the one or more alerts comprising at least one alert item and at least one alert stocking location, the at least one alert item identifying the at least one item of the at least one alert supply chain event and the at least one alert stocking location identifying the at least one stocking location of the at least one alert supply chain event;

render, for display on a user interface, an alert heatmap visualization comprising one or more selectable user interface elements represented by one or more alert elements, each of the one or more alert elements associated with an alert, located on the alert heatmap at a position along a first dimension representing the at least one alert item of the associated alert, located on the alert heatmap at a position along a second dimension representing the at least one alert stocking location of the associated alert, and displayed in a color representing the occurrence risk score of the associated alert; and provide one or more tools for initiating one or more corrective actions to be undertaken in order to resolve one or more underlying causes of the at least one alert supply chain event.

16. The non-transitory computer-readable medium of claim 15, wherein the software when executed is further configured to:
   identify one or more factors relied on by the prediction model to generate the occurrence risk score, the one or more factors associated with one or more supply chain features; and
   generate a visualization representing a magnitude and a direction of a contribution by each of the one or more features to the occurrence risk score.

17. The non-transitory computer-readable medium of claim 16, wherein the software when executed is further configured to:
   detect selection of at least one of the one or more selectable user interface elements represented by the one or more alert elements;
   identify a selected alert associated with the one or more alert elements that represent the at least one of the one or more selectable user interface elements; and
   display a precision value of the selected alert for the supply chain event, the precision value indicating a probability the supply chain event will occur based on the past performance of the prediction model for predicting the supply chain event.

18. The non-transitory computer-readable medium of claim 17, wherein the prediction model comprises a gradient boosted trees machine learning model, and the prediction period is less than a planning horizon and at least as long as a minimum amount of time for completing one or more corrective actions.

19. The non-transitory computer-readable medium of claim 18, wherein the supply chain event is a service level failure, and the occurrence risk score is a failure risk score.

20. The non-transitory computer-readable medium of claim 19, wherein the software when executed is further configured to:
   identify one or more properties of the one or more alerts;
   receive a filter comprising one or more criteria;
   detect each of the one or more alerts having one or properties corresponding to the one or more criteria of the filter; and
   filter each of the one or more alerts detected as having one or more properties corresponding to the one or more criteria of the filter by rendering a filtered alert element for each of the filtered one or more alerts, the filtered alert element located on the alert heatmap at a position along a first dimension representing the at least one alert item of the associated alert, located on the alert heatmap at a position along a second dimension representing the at least one alert stocking location of the associated alert, and displayed in a color different than the color representing the occurrence risk score of the associated alert.

\* \* \* \* \*